United States Patent
Sawada

(10) Patent No.: US 10,300,795 B2
(45) Date of Patent: May 28, 2019

(54) REGENERATIVE BRAKING CONTROL DEVICE OF ELECTRIC VEHICLE

(71) Applicant: Nissan Motor Co., Ltd., Kanagawa (JP)

(72) Inventor: Akira Sawada, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 14/375,165

(22) PCT Filed: Jan. 24, 2013

(86) PCT No.: PCT/JP2013/051373
§ 371 (c)(1),
(2) Date: Jul. 29, 2014

(87) PCT Pub. No.: WO2013/115042
PCT Pub. Date: Aug. 8, 2013

(65) Prior Publication Data
US 2014/0379190 A1     Dec. 25, 2014

(30) Foreign Application Priority Data
Jan. 31, 2012  (JP) .................... 2012-018057

(51) Int. Cl.
*B60L 7/18*     (2006.01)
*B60L 15/20*    (2006.01)
(Continued)

(52) U.S. Cl.
CPC ................ *B60L 7/18* (2013.01); *B60L 7/14* (2013.01); *B60L 7/26* (2013.01); *B60L 15/2009* (2013.01);
(Continued)

(58) Field of Classification Search
CPC ...... B60L 7/10; B60L 7/18; B60L 7/24; B60L 7/26; B60L 15/2009; B60L 15/2018; B60L 15/2063; B60T 2270/60
See application file for complete search history.

(56) References Cited

U.S. PATENT DOCUMENTS 6,116,704 A * 9/2000 Nakakita ............... B60L 7/10
                                                    180/65.1
2007/0018499 A1* 1/2007 Kokubo ............... B60K 6/445
                                                    303/151
(Continued)

FOREIGN PATENT DOCUMENTS

JP        6-70406 A    3/1994
JP        8-79907 A    3/1996
(Continued)

OTHER PUBLICATIONS

Solberg, Greg, "The Magic of Tesla Roadster Regenerative Braking", Jun. 29, 2007, Tesla Motors, https://www.tesla.com/blog/magic-tesla-roadster-regenerative-braking.*
(Continued)

*Primary Examiner* — Spencer D Patton
(74) *Attorney, Agent, or Firm* — Osha Liang LLP

(57) ABSTRACT

A regenerative braking control device of an electric vehicle, wherein, in an electric vehicle system that includes an electric motor coupled to a drive wheel, the regenerative braking control device has an electric motor controller that controls powering or regeneration of the electric motor, and a regeneration amount setting unit that sets a regeneration amount by a driver operation and that can change the regeneration amount according to an intention of a driver. The electric motor controller includes a regeneration instruction torque limitation unit that limits, immediately before stop of the vehicle with a motor rotation speed in a low- (Continued)

speed area, the regeneration amount to be decreased as a motor rotation speed is lowered.

9 Claims, 13 Drawing Sheets

(51) Int. Cl.
    *B60T 1/10*     (2006.01)
    *B60L 7/14*     (2006.01)
    *B60L 7/26*     (2006.01)

(52) U.S. Cl.
    CPC ............ *B60L 15/2018* (2013.01); *B60T 1/10* (2013.01); *B60L 2240/14* (2013.01); *B60L 2240/421* (2013.01); *B60L 2240/423* (2013.01); *B60L 2240/461* (2013.01); *B60L 2240/465* (2013.01); *B60T 2270/604* (2013.01); *Y02T 10/645* (2013.01); *Y02T 10/7275* (2013.01)

(56) References Cited

U.S. PATENT DOCUMENTS

2007/0228822 A1* 10/2007 Hirata ...................... B60K 6/48
                                                  303/151
2010/0332096 A1* 12/2010 Hanzawa ............. B60K 31/047
                                                  701/70
2011/0276243 A1* 11/2011 Minarcin .............. B60W 10/08
                                                  701/70
2012/0133202 A1* 5/2012 Mui ......................... B60L 3/10
                                                 303/152
2013/0162009 A1* 6/2013 Mitts ...................... B60L 3/102
                                                   303/3

FOREIGN PATENT DOCUMENTS

| JP | 2002-58105 A | 2/2002 |
| JP | 2004-215447 A | 7/2004 |
| JP | 2007-151397 A | 6/2007 |
| JP | 2011-147208 A | 7/2011 |

OTHER PUBLICATIONS

International Search Report for corresponding International Application No. PCT/JP2013/051373, dated Apr. 16, 2013 (5 pages).
Written Opinion for corresponding International Application No. PCT/JP2013/051373, dated Apr. 16, 2013 (6 pages).
International Preliminary Report on Patentability for corresponding International Application No. PCT/JP2013/051373, dated May 13, 2014 (7 pages).

* cited by examiner

REGENERATIVE BRAKING CONTROL DEVICE OF ELECTRIC VEHICLE

TECHNICAL FIELD

The present invention relates to a regenerative braking control device of an electric vehicle that can change a regeneration amount according to the intention of a driver.

BACKGROUND ART

Conventionally, with respect to a regenerative braking control device that is a control device using an electric motor of an electric vehicle as a drive source and that can obtain a braking force by the regenerative braking of the electric motor, a device is known that is intended to be able to adjust a regeneration amount according to the intention of a driver (JPH08079907A1).

This conventional device includes a battery, a drive electric motor that can drive wheels by power from the battery and a drive system control unit that controls the operation of the electric motor. The conventional device also includes a mechanical braking unit that achieves a braking force according to the stepping force of a brake pedal input from the brake pedal and a regenerative braking unit that adds additional braking to the wheels by regeneration of the rotational energy of the wheels. An electric vehicle including the regenerative braking described above is configured such that when the electric motor uses the regenerative braking, the regeneration amount can be varied, and a regeneration amount setting unit is provided that can set the regeneration amount of the electric motor according to the intention of a driver.

SUMMARY OF INVENTION

Incidentally, in an electric vehicle, such as an electric automobile or a hybrid vehicle, that includes a regeneration amount setting unit configured to be able to change a regeneration amount according to the intention of a driver, when its speed is reduced to a low-speed area, it is necessary to decrease the regeneration amount in the low-speed area.

However, as with a conventional electric vehicle regenerative braking control device, regenerative braking is performed at the same regeneration amount as in a high-speed area over a low-speed area, the vehicle is backed or vibrations (=acceleration vibrations) that shake the vehicle back and forth are produced by sudden removal of a torque, with the result that an uncomfortable feeling is produced.

Consequently, in the electric vehicle that can change the regeneration amount according to the intention of the driver, a passenger feels the vibrations to be shocks or feels them to be uncomfortable vibrations, and thus a feeling of smooth deceleration of the electric vehicle is disadvantageously degraded.

One or more embodiments of the present invention provides, in an electric vehicle that can change a regeneration amount according to the intention of a driver, a regenerative braking control device of the electric vehicle that can acquire a feeling of smooth deceleration without acceleration vibrations until immediately before the vehicle is stopped.

One aspect of the present invention, there is provided an electric vehicle system that includes an electric motor coupled to a drive wheel, an electric motor controller which controls powering/regeneration of the electric motor and a regeneration amount setting unit which sets a regeneration amount by a driver operation and that can change the regeneration amount according to an intention of a driver. In the regenerative braking control device of an electric vehicle, the electric motor controller includes a regeneration instruction torque limitation unit that limits, immediately before stop of the vehicle with a motor rotation speed in a low-speed area, the regeneration amount to be decreased as a motor rotation speed is lowered.

The regeneration instruction torque limitation unit includes a gradient correction torque calculation portion that calculates a gradient correction torque according to a plurality of limit maps which are set with reference to a flat road and a road surface gradient, and a torque value obtained based on any map selected from the limit maps and the motor rotation speed is set at a limit map lower limit value, and a regeneration torque lower limit value is calculated by correction of the limit map lower limit value with the gradient correction torque such that regeneration instruction torque limitation processing is performed to correspond to variations in the road surface gradient.

Hence, the regeneration instruction torque limitation unit limits, immediately before stop of the vehicle with the motor rotation speed in the low-speed area, the regeneration amount determined according to the intention of the driver to be decreased as the motor rotation speed is lowered.

In other words, immediately before stop of the vehicle with the motor rotation speed in the low-speed area, the control is performed such that the regeneration torque is gradually removed as the motor rotation speed is lowered, and thus smooth deceleration without acceleration vibrations is realized until immediately before stop of the vehicle.

Consequently, in the electric vehicle that can change the regeneration amount according to the intention of the driver, it is possible to acquire a smooth deceleration feeling without acceleration vibrations until immediately before stop of the vehicle.

Since the regeneration instruction torque limitation processing is performed to correspond to variations in the gradient of the road surface, it is possible to smoothly stop the vehicle, regardless of the stop of the vehicle on the gradient road surface, such that when the vehicle is stopped on an uphill gradient, the vehicle is prevented from sliding down in a downward direction whereas when the vehicle is stopped on a downhill gradient, the vehicle is prevented from sliding down in a forward direction.

Furthermore, the gradient correction torque calculation portion for calculating the gradient correction torque according to the road surface gradient is provided, the limit map lower limit value with reference to a flat road obtained by the regeneration instruction torque limitation processing is corrected by the gradient correction torque and thus the regeneration torque lower limit value is calculated, with the result that, with a simple configuration in which a large number of limit maps corresponding to the road surface gradient are not prepared, it is possible to smoothly stop the vehicle on any gradient road surface such as an uphill gradient or a downhill gradient.

DESCRIPTION OF EMBODIMENTS

An embodiment of a regenerative braking control device of an electric vehicle according to the present invention will be described below based on a first embodiment shown in drawings.

First Embodiment

A configuration will first be described. The configuration of the regenerative braking control device of an electric vehicle (an example of the electric car) in the first embodiment are divided into an "overall system configuration", a "regenerative braking control configuration" and a "regeneration instruction torque calculation configuration", and they will be described.

[Overall System Configuration]

Figure 1:
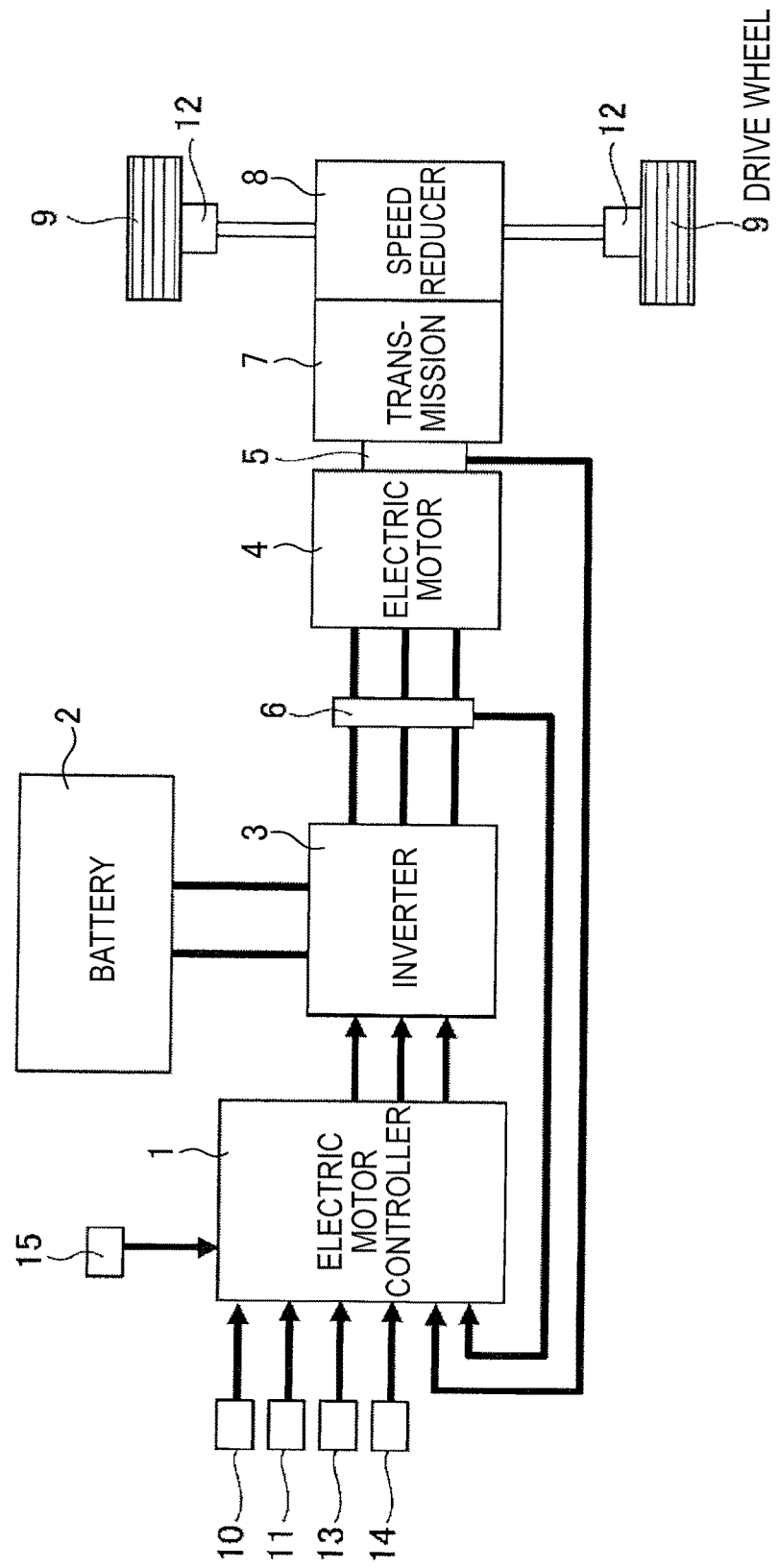
FIG. 1 is an overall system configuration diagram showing an electric vehicle to which a regenerative braking control device of a first embodiment is applied.

FIG. 1 shows the electric vehicle to which the regenerative braking control device of the first embodiment is applied. The overall system configuration will be described below with reference to FIG. 1.

As shown in FIG. 1, the electric vehicle to which the regenerative braking control device of the first embodiment is applied includes an electric motor controller 1, a battery 2, an inverter 3, an electric motor 4, a motor rotation sensor 5, a current sensor 6, a transmission 7 and a speed reducer 8 and drive wheels 9.

The electric motor controller 1 inputs, as digital signals, the signals of various vehicle variables such as a vehicle speed V, an accelerator opening θ, a rotor mechanical angular velocity ωm of the electric motor 4 and the motor current of the electric motor 4 (in the case of three-phase alternating current, individual phase currents iu, iv and iw). Then, a PWM signal for controlling the electric motor 4 according to the various vehicle variables is generated, and a drive signal of the inverter 3 is generated according to the PWM signal through a drive circuit. Signals from the rotation sensor 5, the current sensor 6, an accelerator opening sensor 10, a steering switch 11, a wheel speed pulse sensor 12, a back-and-forth acceleration sensor 13, a brake stroke sensor 14 and a stop regeneration switch 15 are input to the electric motor controller 1.

The steering switch 11 is a regeneration amount setting unit that increases or decreases the regeneration amount according to the intention of a driver. The steering switch 11 is provided in the position of a steering wheel, and uses a paddle operation switch that performs an up-operation of decreasing the regeneration amount and a down-operation of increasing the regeneration amount.

The stop regeneration switch 15 is an on/off switch that can select, according to the intention of the driver, whether the regeneration until the vehicle is stopped or the regeneration until creep is performed.

The battery 2 is a secondary battery that is connected to the inverter 3, and charges the regeneration power of the electric motor 4 and discharges the drive power thereof through the inverter 3.

The inverter 3 is formed with, for example, two switching elements (for example, a power semiconductor element such as an IGBT) for each phase. The switching elements are turned on and off according to the drive signal, and thus a direct current supplied from the battery 2 is converted or reversely converted into an alternating current, with the result that a desired current is passed to the electric motor 4.

The electric motor 4 generates a drive force by the alternating current supplied from the inverter 3, and transmits the drive force to the drive wheels 9 through the transmission 7 and the reduction gear 8. When the electric motor 4 is rotated together by the drive wheels 9 when the vehicle travels, the electric motor 4 generates a regeneration drive force to regenerate energy.

The motor rotation sensor 5 is a resolver or an encoder that is provided in the rotation shaft of the electric motor 4, and detects the rotor phase (electrical angle) of the electric motor 4.

The current sensor 6 is provided in the position of a three-phase harness that connects the inverter 3 and the electric motor 4, and detects the three-phase currents iu, iv and iw of the electric motor 4.

The transmission 7 is a two-speed transmission with a low gear and a high gear; the speed reducer 8 is connected to the transmission 7, and thus a drive torque is transmitted to the drive wheels 9, with the result that a setting is made such that the acceleration function and the maximum speed of the electric vehicle are achieved. Although in the first embodiment, the two-speed transmission is used, a multi-speed transmission, a continuously variable transmission or no transmission can be used.

[Regenerative Braking Control Configuration]

Figure 2:
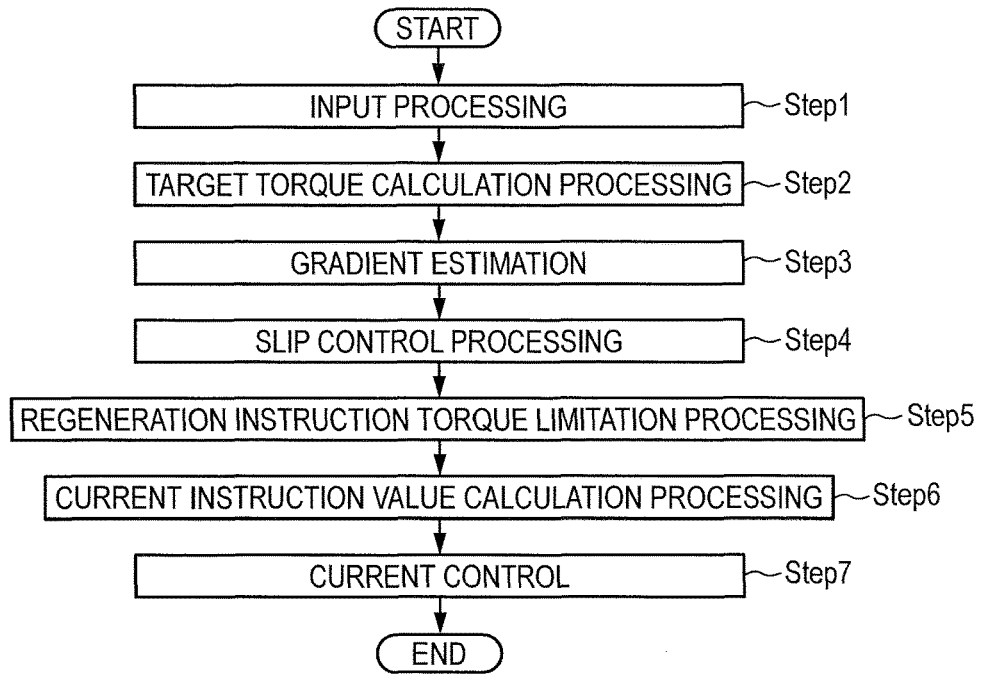
FIG. 2 is a flowchart showing the flow of regenerative braking control processing performed by an electric motor controller of the first embodiment.

FIG. 2 is a flowchart showing the flow of regenerative braking control processing performed in the electric motor controller 1 of the first embodiment every control computation period. The individual steps of FIG. 2 showing the configuration of the regenerative braking control will be described below with reference to FIGS. 3 to 6.

In step S1, a signal necessary for the control computation, which will be describe below, is subjected to sensor input or input processing acquired from another controller by communication, and the process proceeds to step S2.

The three-phase currents iu, iv and iw flowing through the electric motor 4 are acquired by the current sensor 6. Since the sum of the three-phase currents is zero, for example, iw may be determined by calculation from the values of iu and iv instead of subjecting iw to sensor input.

The rotor phase (electrical angle) [rad] of the electric motor 4 is acquired by the rotation sensor 5 such as a resolver or an encoder.

The motor rotation speed Nm [rpm] is determined by dividing a rotor angular velocity ω by the number of pole pairs of the electric motor 4 to determine the rotor mechanical angular velocity ωm [rad/s] that is a mechanical angular velocity of the electric motor 4 and thereafter multiplying it by a unit conversion factor (60/2π) from [rad/s] to [rpm].

The vehicle speed V [km/h] is acquired by the wheel speed pulse sensor 12.

The accelerator opening θ [%] is acquired by the accelerator opening sensor 10, and alternately, it may be acquired by a vehicle controller or other controllers through communication.

The regeneration amount corresponding to the intention of the driver is acquired by steering SW (UP&DOWN) from the steering switch 11.

A direct-current voltage value Vdc [V] is determined by a voltage sensor installed in a direct-current power supply line or a power supply voltage value transmitted from a battery controller.

Figure 5:
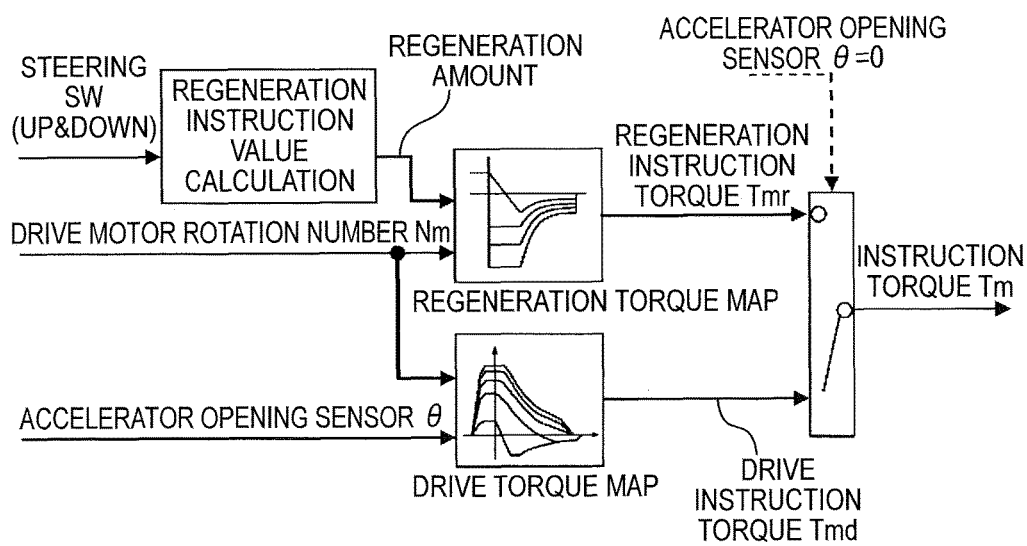
FIG. 5 is a block diagram showing instruction torque calculation in the regenerative braking control processing in the first embodiment.
Figure 6:
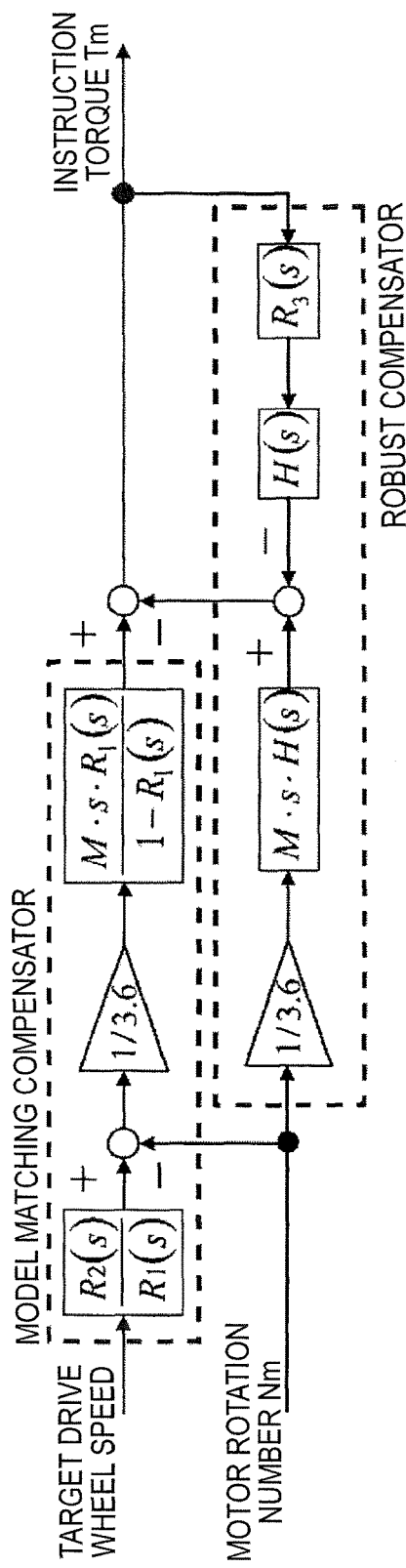
FIG. 6 is a control block diagram showing a vehicle wheel servo in the regenerative braking control processing in the first embodiment.

In step S2, following the input processing in step S1, as shown in FIG. 5, based on the steering SW (UP&DOWN), the motor rotation speed Nm and the accelerator opening θ, target torque calculation processing for calculating an instruction torque Tm is performed, and the process proceeds to step S3.

Figure 3:
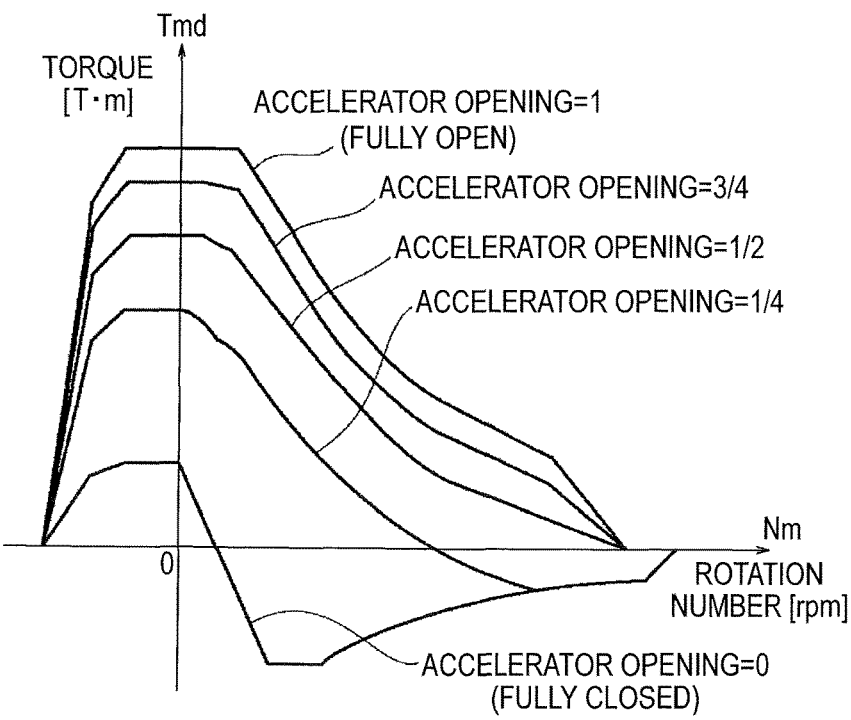
FIG. 3 is a drive torque map diagram showing an example of a drive torque map used in the regenerative braking control processing in the first embodiment.

When the accelerator opening θ>0, a drive torque map shown in FIG. 3 is used to determine a drive instruction torque Tmd, and the drive instruction torque Tmd is made the instruction torque Tm.

Figure 4:
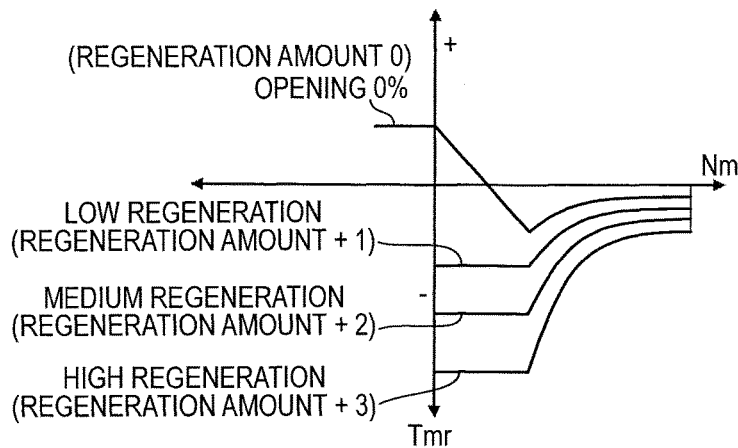
FIG. 4 is a regeneration torque map diagram showing an example of a regeneration torque map used in the regenerative braking control processing in the first embodiment.

When the accelerator opening θ=0, a regeneration torque map shown in FIG. 4 is used to determine a regeneration instruction torque Tmr, and the regeneration instruction torque Tmr is made the instruction torque Tm. The steering SW(UP) and the steering SW(DOWN) by the operation of the steering switch 11 according to the intention of the driver are summed, and the sum is made the regeneration amount (for example, the regeneration amount=0, the regeneration amount=+1, the regeneration amount=+2, the regeneration amount=+3). Then, one characteristic corresponding to the regeneration amount is selected from the four regeneration amount characteristics of the regeneration torque map shown in FIG. 4, and the regeneration instruction torque Tmr is determined from the selected one characteristic and the motor rotation speed Nm.

In step S3, following the target torque calculation processing in step S2, gradient estimation for estimating the gradient of the vehicle from the value (m/s^2) of the back-and-forth acceleration sensor 13 and the motor rotation speed (Nm) is performed, and the process proceeds to step S4.

With consideration given to a tire radius and a gear ratio, it is possible to convert the motor rotation speed (Nm) into the vehicle speed V (m/s). The wheel speed pulse sensor 12 or the like may be used. Then, the vehicle speed V is subjected to approximate differentiation and is converted into deceleration (m/s^2). Then, by subtraction of the deceleration measured by the back-and-forth acceleration sensor 13 and the deceleration obtained by differentiating the vehicle speed V, it is possible to calculate a static (at the time of stop of the vehicle) deceleration component. By converting this value, it is possible to calculate the Sine gradient α of the vehicle.

Although in the first embodiment, the gradient estimation is performed from the back-and-forth acceleration sensor 13 and the vehicle speed V, a gradient measurement method using a 3-axis gyro sensor, a GPS measuring device or the like may be adopted.

In step S4, following the gradient estimation in step S3, slip control processing in which based on the motor rotation speed (Nm) and a driven wheel speed (V), the state of the slip of a driven wheel is determined, and when a slip is determined to be present, slipon=1 whereas when no slip is determined to be present, slipon=0 is performed, and the process proceeds to step S5.

When a slip is determined to be present, the instruction torque Tm calculated in step S2 is subjected to torque down whereas when no slip is determined to be present, control is performed according to the instruction torque Tm. Slip control using a robust model matching system shown in FIG. 6 or the like may be performed.

In step S5, following the slip control processing in step S4, immediately before the vehicle is stopped, regeneration instruction torque limitation processing in which as the motor rotation speed Nm (vehicle speed) is lowered, the regeneration amount is limited to be decreased is performed, and the process proceeds to step S6 (regeneration instruction torque limitation unit).

Figure 7:
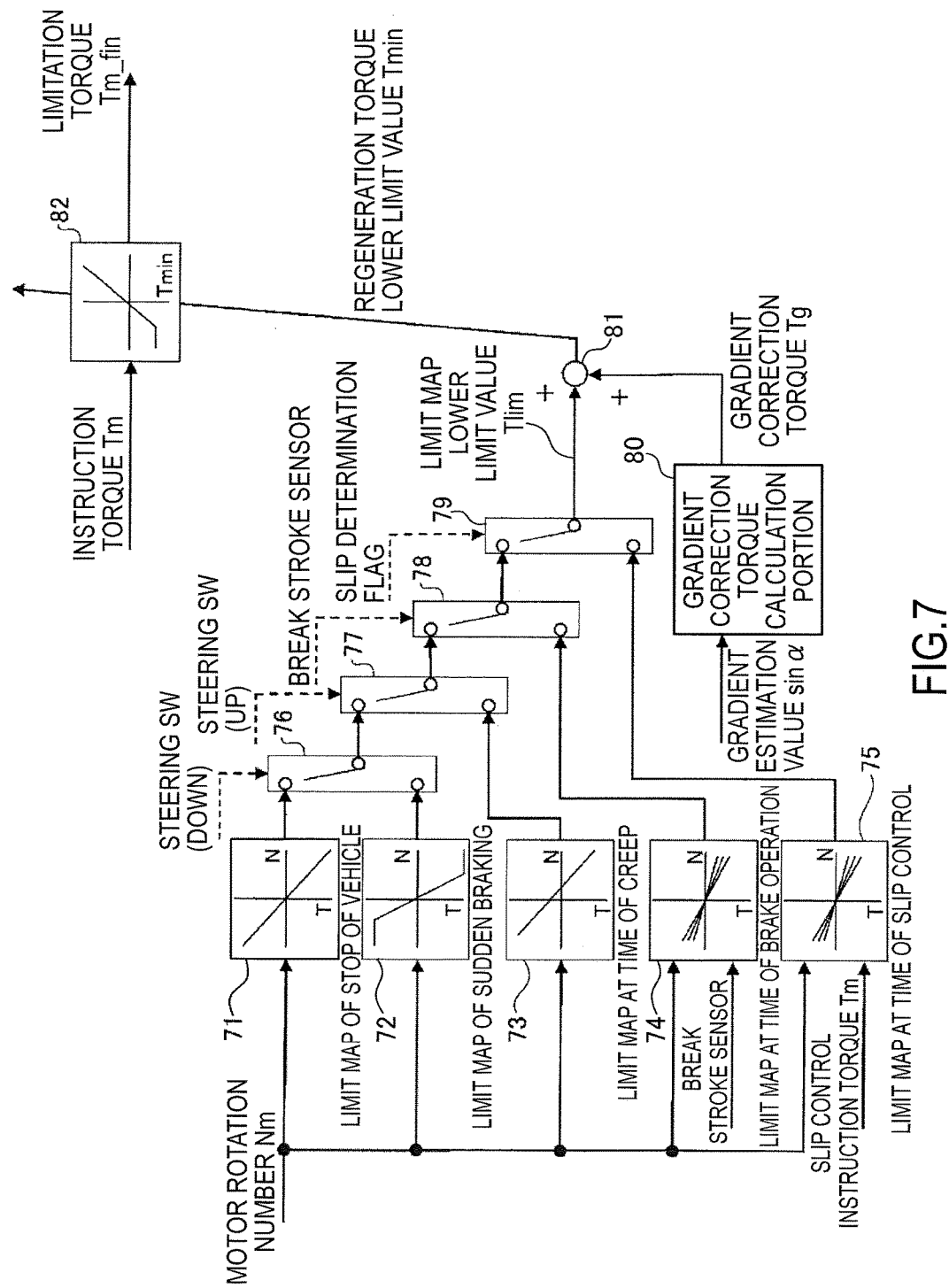
FIG. 7 is a block diagram showing regeneration instruction torque limitation processing in the regenerative braking control processing in the first embodiment.
Figure 9:
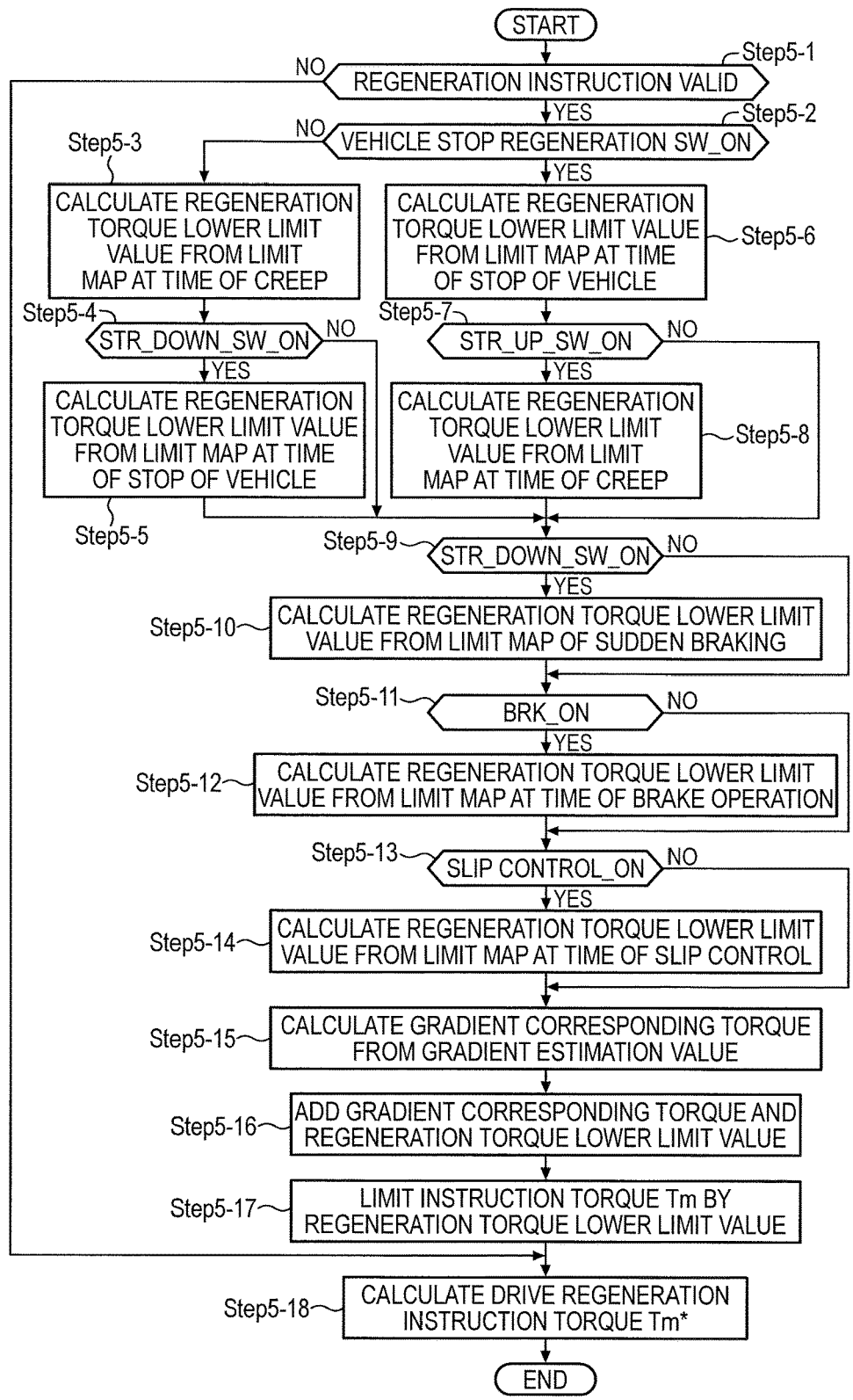
FIG. 9 is a flowchart showing regeneration instruction torque calculation processing in the regenerative braking control processing in the first embodiment.

In the regeneration instruction torque limitation processing, when the regeneration amount limitation processing is started, even if an instruction to change the regeneration amount (the operation of the steering switch 11) from the driver is provided, it is not received. In the regeneration instruction torque limitation processing, the motor rotation speed Nm, the steering SW (UP&DOWN), stroke information on the brake, a slip determination flag slipon, a gradient estimation value α and the like are used to calculate a regeneration torque lower limit value Tmin. Then, the value limited by the regeneration torque lower limit value Tmin is made a limitation torque Tm_fin, and the instruction torque Tm is stored in a drive regeneration instruction torque Tm*. The regeneration instruction torque limitation processing will be described in detail later (FIGS. 7 and 9).

In step S6, following the regeneration instruction torque limitation processing in step S5, current instruction value calculation processing in which dq axis current target values id* and iq* are determined, with respect to a table, from the drive regeneration instruction torque Tm* calculated in step S5, the motor rotation speed Nm and the direct-current voltage value Vdc is performed, and the process proceeds to step S7.

In step S7, following the current instruction value calculation processing in step S6, current control is performed, and the process proceeds to END.

In this current control, dq axis current values id and iq are first computed from the three-phase current values iu, iv and iw and the motor rotation speed Nm. Then, dq axis voltage instruction values vd and vq are computed from the deviation of the dq axis current target values id* and iq* calculated in step S6 and the dq axis currents id and iq. Non-interaction control may be performed on this portion. Then, three-phase voltage instruction values vu, vv and vw are computed from the dq axis voltage instruction values vd and vq and the rotor mechanical angular velocity ωm. The PWM signal (on duty) to [%], tv [%] and tw [%] are computed from the three-phase voltage instruction values vu, vv and vw and the direct-current voltage Vdc.

[Regeneration Instruction Torque Limitation Processing Configuration]

FIG. 7 is a block diagram showing the regeneration instruction torque limitation processing of the regenerative braking control processing in the first embodiment. The regeneration instruction torque limitation processing configuration will be described below with reference to FIGS. 7 and 8.

In the regeneration instruction torque limitation processing configuration of the first embodiment, as shown in FIG. 7, as regeneration torque limit maps, a limit map of stop of the vehicle 71, a limit map of sudden braking 72, a limit map at the time of creep 73, a limit map at the time of the brake operation 74 and a limit map at the time of slip control 75.

In the limit map of stop of the vehicle 71, a limit characteristic is set in which as the motor rotation speed Nm (vehicle speed) is lowered, the regeneration amount is limited to be decreased, and thus a limit map lower limit value Tlim is obtained such that the vehicle is stopped. In other words, the limit characteristic is set in which when the motor rotation speed Nm=0 (a vehicle speed of 0 km/h), the limit map lower limit value Tlim is zero torque such that the vehicle is stopped. The inclination of the limit characteristic is determined, from the results of a vehicle experiment and the like, such that it is possible to reduce the acceleration vibrations over a lower-speed area without loss of a feeling of deceleration. With respect to the other limit map of sudden braking 72, the limit map at the time of the brake operation 74, the limit map at the time of slip control 75, as in the limit map of stop of the vehicle 71, the limit characteristic is set such that the vehicle is stopped.

Moreover, in the limit map of stop of the vehicle 71, a second quadrant that is the drive torque in negative rotation is also made to have the limit characteristic. With respect to the other limit map of sudden braking 72, the limit map at the time of creep 73, the limit map at the time of the brake operation 74 and the limit map at the time of slip control 75, as in the limit map of stop of the vehicle 71, the second quadrant is also made to have the limit characteristic.

The limit map of sudden braking 72 is selected when a deceleration instruction (steering SW_DOWN) is further provided immediately before the stop of the vehicle, and the inclination of the limit characteristic is steeper than in the limit map of stop of the vehicle 71. The inclination of the limit characteristic is set such that when the vehicle is urgently stopped, the distance for the stop is the shortest, and it is determined from the results of a vehicle experiment and the like.

When an acceleration instruction (steering SW_UP) is provided immediately before the stop of the vehicle, the limit map selected at that time is switched to the limit map at the time of creep 73. In the limit map at the time of creep 73, the creep characteristic in which the limit map lower limit value Tlim is positive at a vehicle speed of 0 km/h is set so as to be suitable for low-speed travel (creep travel) immediately before the stop of the vehicle. The inclination of the creep characteristic is determined from the results of a vehicle experiment and the like so as to be suitable for travelling to follow the automobile ahead.

The limit map at the time of the brake operation 74 is selected when the driver performs an operation on the mechanical brake immediately before the stop of the vehicle, and the inclination of the limit characteristic is set gentler than in the limit map of stop of the vehicle 71. In the limit map at the time of the brake operation 74, the inclination of the limit characteristic is set according to a brake stroke amount. Specifically, as the brake stroke amount is increased, the degree of dependence of the brake is determined to be higher, and the inclination of the limit characteristic is made gentle whereas as the brake stroke amount is decreased, the degree of dependence of the brake is determined to be lower, and the inclination is close to that of the limit characteristic in the limit map of stop of the vehicle 71. This is determined from the results of a vehicle experiment and the like. The amount of operation of the brake may be determined by using a brake liquid pressure or the like.

The limit map at the time of slip control 75 is selected when the slip control (ABS control) for reducing drive wheel slip is performed immediately before the stop of the vehicle, and the inclination of the limit characteristic is set gentler than in the limit map of stop of the vehicle 71. In the limit map at the time of slip control 75, as the instruction torque value Tm at the time of slip control is increased, the inclination of the limit characteristic is made gentler. Specifically, as the instruction torque value Tm is increased, a road surface μ is determined to be higher, and the inclination is close to that of the limit map of stop of the vehicle 71. Whereas as the instruction torque Tm is decreased, the road surface μ is determined to be lower, and the inclination of the limit characteristic is made gentler. This is determined from the results of a vehicle experiment and the like.

In the regeneration instruction torque limitation processing configuration of the first embodiment, as map selection portions, as shown in FIG. 7, a first map selection portion 76, a second map selection portion 77, a third map selection portion 78 and a fourth map selection portion 79 are provided. A torque value obtained based on the map selected and the motor rotation speed Nm is made the limit map lower limit value Tlim.

When immediately before the stop of the vehicle, the limit map of stop of the vehicle 71 is selected, and a deceleration instruction (steering SW_DOWN) is further provided, the first map selection portion 76 switches the selection to the limit map of sudden braking 72.

When immediately before the stop of the vehicle, the limit map of stop of the vehicle 71 or the limit map of sudden braking 72 is selected, and an acceleration instruction (steering SW_UP) is provided, the second map selection portion 77 switches the selection to the limit map at the time of creep 73.

When immediately before the stop of the vehicle, the limit map of stop of the vehicle 71 or the limit map of sudden braking 72 is selected, and the brake operation is performed, the third map selection portion 78 switches the selection to the limit map at the time of the brake operation 74.

When immediately before the stop of the vehicle, the limit map of stop of the vehicle 71, the limit map of sudden braking 72, the limit map at the time of creep 73 or the limit map at the time of the brake operation 74 is selected, and the slip determination flag is raised, the fourth map selection portion 79 switches the selection to the limit map at the time of slip control 75.

In the regeneration instruction torque limitation processing configuration of the first embodiment, as a limitation torque calculation configuration, as shown in FIG. 7, a gradient correction torque calculation portion 80, a torque adder 81 and a torque limiter 82 are included.

The gradient correction torque calculation portion 80 is provided so that the regeneration instruction torque limitation processing is performed to correspond to variations in the gradient of the road surface, and calculates a gradient correction torque Tg according to the gradient estimation value α of the gradient of the road surface. A method of calculating the gradient correction torque Tg will be described in detail later.

In the torque adder 81, the limit map lower limit value Tlim and the gradient correction torque Tg are added, and a value resulting from the addition is made the regeneration torque lower limit value Tmin.

In the torque limiter 82, a value obtained by limiting the instruction torque Tm with the regeneration torque lower limit value Tmin is made the limitation torque Tm_fin.

Figure 8:
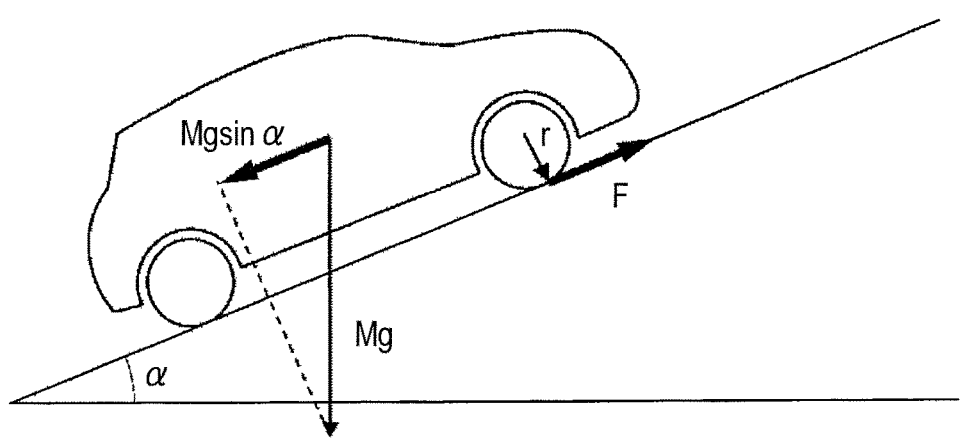
FIG. 8 is a schematic diagram showing gradient correction torque calculation in the regeneration instruction torque limitation processing in the first embodiment.

Here, a way of calculating the gradient correction torque Tg from the gradient estimation value α (estimated in step S3) by the gradient correction torque calculation portion 80 will be described with reference to the schematic diagram of FIG. 8. The individual symbols represent the followings.

M: Equivalent mass of the vehicle including the inertia of the driven wheel
N: Overall gear ratio
R: Tire load radius
Tg: Gradient correction torque (=drive torque corresponding to the gradient)
F: Drive force corresponding to the gradient (force applied to the vehicle)
q: Gravity deceleration (=9.8 m/s^2)

With the following formula, it is possible to calculate a force for preventing the vehicle from being backed.

$$F = M \cdot g \cdot \sin \alpha \quad (1)$$

Then, by addition of the tire load radius r and the gear ratio N, the gradient correction torque is calculated.

$$Tg = F \cdot N \cdot r \quad (2)$$

Then, the following formula is obtained from formulas (1) and (2):

$$Tg = M \cdot g \cdot \sin \alpha \cdot N \cdot r \quad (3)$$

In this way, it is possible to calculate Tg from the estimated gradient estimation value α.

[Regeneration Instruction Torque Calculation Processing Configuration]

FIG. 9 is a flowchart showing regeneration instruction torque calculation processing in the regenerative braking control processing of the first embodiment. The individual steps of FIG. 9 showing a regeneration instruction torque calculation processing configuration will be described below. In the regeneration instruction torque calculation processing of FIG. 9, an instruction to change the regeneration amount from the driver (the operation of the steering switch 11) is used, not as regeneration amount change information, but as deceleration instruction information or acceleration instruction information for selecting the limit map.

In step S5-1, based on the regeneration amount corresponding to the intention of the driver and the accelerator opening θ calculated in step S2, whether or not the regeneration instruction is valid is determined. If the determination is Yes (valid regeneration instruction), the process proceeds to step S5-2 whereas if the determination is No (invalid regeneration instruction), the process proceeds to step S5-18.

In step S5-2, following the determination that the regeneration instruction is valid in step S5-1, whether or not the stop regeneration switch 15 that can be operated according to the intention of the drive is on is determined. If the determination is Yes (vehicle stop regeneration SW_ON), and the regeneration is performed until the stop of the vehicle, the process proceeds to step S5-6 whereas if the determination is No (vehicle stop regeneration SW_OFF), and the regeneration is performed until the creep, the process proceeds to step S5-3.

In step S5-3, following the determination that the vehicle stop regeneration SW_OFF in step S5-2 is performed, the limit map at the time of creep 73 is selected, the limit map lower limit value Tlim is calculated from the motor rotation speed Nm and the limit map at the time of creep 73 and is stored and the process proceeds to step S5-4.

In step S5-4, following the calculation of the limit map lower limit value Tlim in step S5-3, whether or not the motor rotation speed Nm is in the low-speed area and the down-operation of increasing the regeneration amount on the steering switch 11 (deceleration instruction operation) is performed is determined. If the determination is YES (the down-operation is performed), the process proceeds to step S5-5 whereas the determination is No (the down-operation is not performed), the process proceeds to step S5-9.

In step S5-5, following the determination that the down-operation is performed in step S5-4, the limit map is switched from the limit map at the time of creep 73 to the limit map of stop of the vehicle 71, the limit map lower limit value Tlim is calculated from the motor rotation speed Nm and the limit map of stop of the vehicle 71 and the process proceeds to step S5-9.

In step S5-6, following the determination that the vehicle stop regeneration SW_ON in step S5-2 is performed, the limit map of stop of the vehicle 71 is selected, the limit map lower limit value Tlim is calculated from the motor rotation speed Nm and the limit map of stop of the vehicle 71 and is stored and the process proceeds to step S5-7.

In step S5-7, following the calculation of the limit map lower limit value Tlim in step S5-6, whether or not the motor rotation speed Nm is in the low-speed area and the up-operation of decreasing the regeneration amount on the steering switch 11 (acceleration instruction operation) is performed is determined. If the determination is YES (the up-operation is performed), the process proceeds to step S5-8 whereas the determination is No (the up-operation is not performed), the process proceeds to step S5-9.

In step S5-8, following the determination that the up-operation is performed in step S5-7, the limit map is switched from the limit map of stop of the vehicle 71 to the limit map at the time of creep 73, the limit map lower limit value Tlim is calculated from the motor rotation speed Nm and the limit map at the time of creep 73 and the process proceeds to step S5-9.

In step S5-9, following the calculation of the limit map lower limit value Tlim in step S5-5 or step S5-8, whether or not the down-operation of increasing the regeneration amount on the steering switch 11 (acceleration instruction operation) is performed is determined. If the determination is YES (the down-operation is performed), the process proceeds to step S5-10 whereas the determination is No (the down-operation is not performed), the process proceeds to step S5-11.

In step S5-10, following the determination in step S5-9 that the down-operation is performed, the limit map of sudden braking 72 is selected, the limit map lower limit value Tlim is calculated from the motor rotation speed Nm and the limit map of sudden braking 72 and is stored and the process proceeds to step S5-10.

In step S5-11, following the determination in step S5-9 that the down-operation is not performed or the calculation of the limit map lower limit value Tlim in step S5-10, whether or not the brake is stepped on is determined by the stroke sensor 14 of the brake. If the determination is Yes (the brake operation is performed), the process proceeds to step S5-12 whereas if the determination is No (the brake operation is not performed), the process proceeds to step S5-13.

In step S5-12, following the determination in step S5-11 that the brake operation is performed, the limit map at the time of the brake operation 74 is selected, the limit map lower limit value Tlim is calculated from the motor rotation speed Nm, the brake stroke amount and the limit map at the time of the brake operation 74 and is stored and the process proceeds to step S5-13.

In step S5-13, following the determination in step S5-11 that the brake operation is not performed or the calculation of the limit map lower limit value Tlim in step S5-12, whether or not a slip control flag slipon is on is determined. If the determination is Yes (slipon=1), the process proceeds to step S5-14 whereas if the determination is No (slipon=0), the process proceeds to step S5-15.

In step S5-14, following the determination in step S5-13 that slipon=1, the limit map at the time of slip control 75 is selected, the limit map lower limit value Tlim is calculated from the motor rotation speed Nm, the instruction torque Tm and the limit map at the time of slip control 75 and is stored and the process proceeds to step S5-15.

In step S5-15, following the determination in step S5-13 that slipon=0 or the calculation of the limit map lower limit value Tlim in step S5-14, the gradient correction torque Tg is calculated from the gradient estimation value α estimated in step S3 and is stored and the process proceeds to step S5-16.

In step S5-16, following the calculation of the gradient correction torque Tg in step S5-15, the limit map lower limit value Tlim and the gradient correction torque Tg in step S5-15 are added, the regeneration torque lower limit value Tmin is calculated and the process proceeds to step S5-17.

In step S5-17, following the calculation of the regeneration torque lower limit value Tmin in step S5-16, the instruction torque Tm is subjected to limit processing at the regeneration torque lower limit value Tmin, the limitation torque Tm_fin is calculated and the process proceeds to step S5-18.

In this limit processing, in an electric vehicle system that can change the regeneration amount according to the intention of the driver, even if an instruction to change the regeneration amount is provided, the limit processing of the instruction torque Tm is performed at the limit map lower limit value Tlim corresponding to the inclination determined in steps S5-2 to S5-16.

In step S5-18, following the determination in step S5-1 that the regeneration instruction is invalid or the calculation of the limitation torque Tm_fin in step S5-17, the instruction torque Tm or the limitation torque Tm_fin is selected according to whether the regeneration instruction is invalid or valid, the selected torque is stored as the drive regeneration instruction torque Tm* and the process proceeds to END.

Then, an action will be described.

The action of the regenerative braking control device of the electric vehicle of the first embodiment is divided into a "regeneration amount change action before entrance into the limit processing", a "regenerative braking vehicle stop basic action by the limit processing" and a "regenerative braking vehicle stop action in a different vehicle stop mode", and they will be described.

[Regeneration Amount Change Action Before Entrance into the Limit Processing]

While the vehicle is travelling, when in order to decelerate the vehicle, an accelerator step-off operation (the accelerator opening θ=0) is performed, in the flowchart of FIG. 2, the process proceeds from step S1 to step S2, and in step S2, the regeneration instruction torque Tmr is determined using the regeneration torque map shown in FIG. 4. Here, the steering SW(UP) and the steering SW(DOWN) by the operation of the steering switch 11 according to the intention of the driver are summed, and for example, the regeneration amount=0, the regeneration amount=+1, the regeneration amount=+2 or the regeneration amount=+3. Then, one characteristic corresponding to the regeneration amount is selected from the four regeneration amount characteristics of the regeneration torque map shown in FIG. 4, and the regeneration instruction torque Tmr is determined from the selected one characteristic and the motor rotation speed Nm.

Then, in the flowchart of FIG. 2, the process proceeds from step S2 to step S3 to step S4 to step S5 and then to step S6. In step S6, the regeneration instruction torque Tmr determined in step S2 is made the drive regeneration instruction torque Tm* without being processed, and dq axis current target values id* and iq* are determined, from the motor rotation speed Nm and the direct-current voltage value Vdc with reference to a table. Then, in step S7, the current instruction value calculation processing in step S6 is performed, and finally, the PWM signal (on duty) to [%], tv [%] and tw [%] are computed from the three-phase voltage instruction values vu, vv and vw and the direct-current voltage Vdc.

By the PWM signal determined as described above, the switching element of the inverter 3 is controlled to be turned on and off, and thus it is possible to drive the electric motor 4 with a desired torque indicated by the drive regeneration instruction torque Tm*.

Hence, until entrance into the limit processing immediately before the stop of the vehicle, when the regeneration amount is determined according to the intention of the driver, the characteristic corresponding to the regeneration amount is selected from the regeneration torque map shown in FIG. 4, and it is possible to obtain the regeneration amount with the selected characteristic and the motor rotation speed Nm (vehicle speed).

[Regenerative Braking Vehicle Stop Basic Action by the Limit Processing]

As described above, in the electric vehicle provided with the steering switch 11 (regeneration amount setting unit) for varying the regeneration amount according to the intention of the driver, when the regeneration is performed according to the selected regeneration amount characteristic until the stop of the vehicle, vibrations or the like disadvantageously occur. Hence, it is necessary to take a measure until the stop of the vehicle since the vehicle speed immediately before the stop of the vehicle is achieved. A regenerative braking vehicle stop basic action by the limit processing reflecting this will be described below with reference to FIGS. 10 and 11.

An example where in the vehicle speed area (low-speed area) immediately before the stop of the vehicle, the limit processing for reducing the regeneration amount is not performed is first assumed to be a comparative example. Then, FIG. 10 is a time chart showing, in the comparative example, responses for deceleration when a braking force is applied to the motor at the regeneration amount corresponding to the intention of the driver, and the vehicle is decelerated from the state of travel to the stop of the vehicle.

In the comparative example, even at time t1 when the vehicle speed immediately before the stop of the vehicle is reached, the regeneration amount (instruction torque) is not reduced to zero, and the regeneration amount (instruction torque) is kept constant until time t2 when a wheel speed becomes zero. Then, at the time t2 when the wheel speed becomes zero, the regeneration amount (instruction torque) is returned to a step characteristic.

Figure 10:
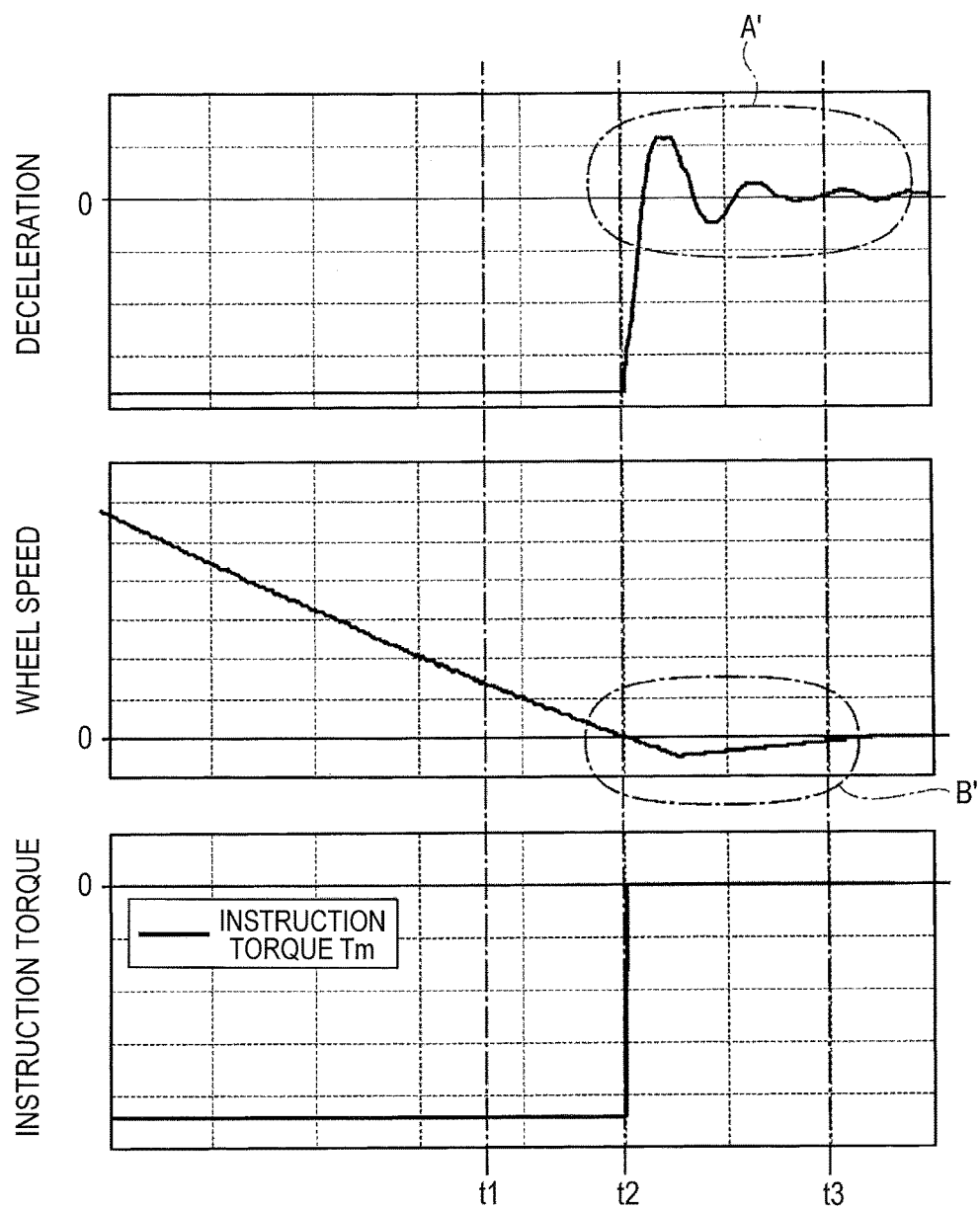
FIG. 10 is a time chart showing the characteristics of deceleration, a vehicle wheel speed and an instruction torque when the regenerative braking control is performed immediately before stop of the vehicle in an electric vehicle of a comparative example.

Hence, since the instruction torque is rapidly removed, as shown in a deceleration characteristic within the A' frame of FIG. 10, significant variations in deceleration are found from time t2 to time t3, with the result that it is found that acceleration vibrations occur due to pitching. With respect to the wheel speed, as shown in a wheel speed characteristic within the B' frame of FIG. 10, the wheel speed is zero or less from time t2 to time t3, with the result that it is found that the vehicle is travelling backward.

Figure 11:
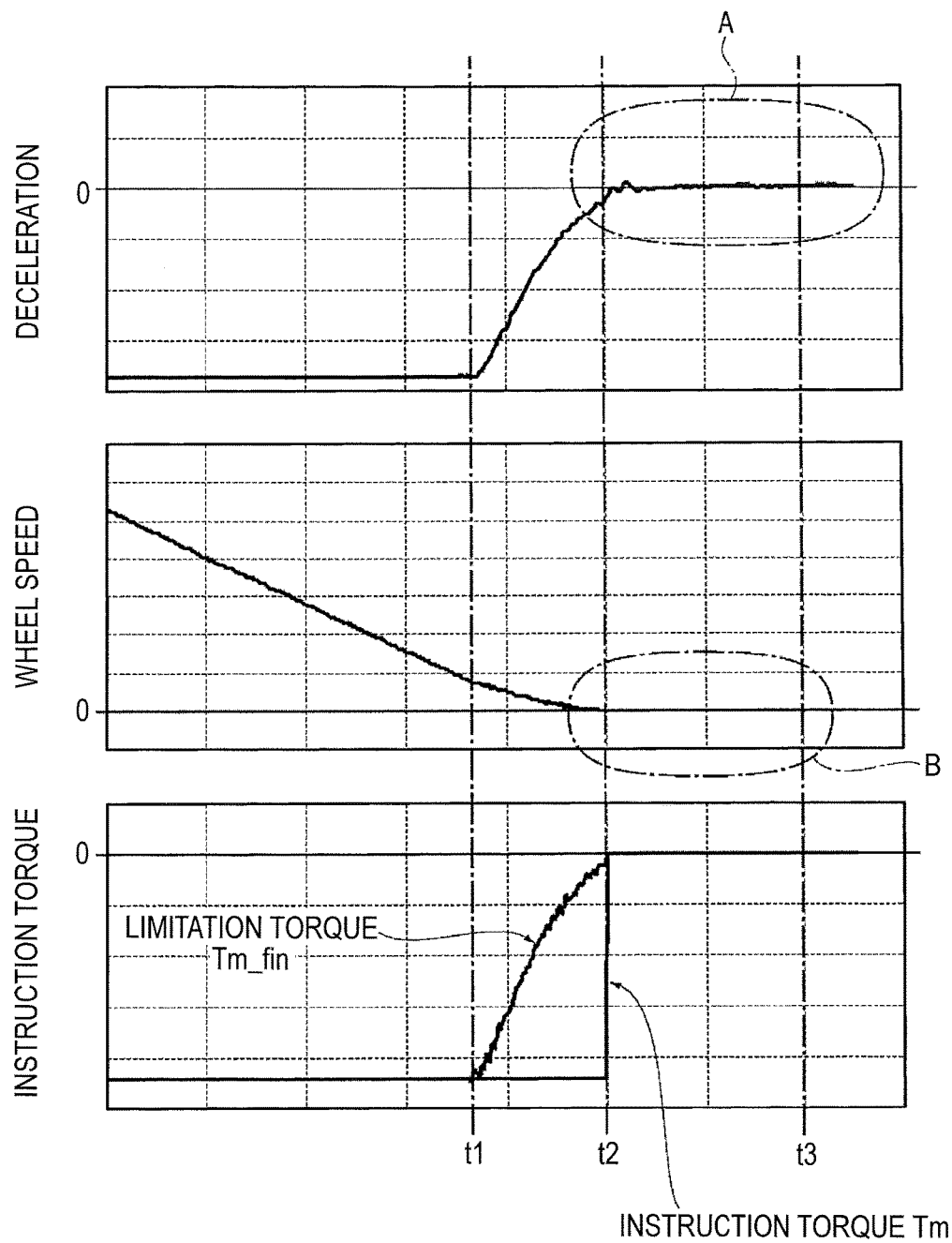
FIG. 11 is a time chart showing the characteristics of deceleration, a vehicle wheel speed and an instruction torque when the regenerative braking control is performed immediately before stop of the vehicle in the electric vehicle of the first embodiment.

On the other hand, the result of the first embodiment in which immediately before the stop of the vehicle, the limit processing for limiting the regeneration amount to be decreased as the vehicle speed is lowered is performed is shown in FIG. 11.

As in the comparative example, the state where the vehicle is decelerated by the regeneration instruction of the driver is shown, and the state where the instruction torque is returned by the step characteristic at time t2 where the wheel speed becomes zero is shown. However, in the first embodiment, from time t1 to time t2 immediately before the stop of the vehicle, the instruction torque Tm is gradually limited by the limitation torque Tm_fin corresponding to the motor rotation speed Nm (vehicle speed). As described above, the limitation torque Tm_fin is used, and thus the deceleration is gradually removed from time t1 to time t2, with the result that it is found that as shown in a deceleration characteristic within the A frame of FIG. 11, acceleration vibrations do not occur from time t2 to time t3. With respect to the wheel speed, it is found that as shown in a wheel speed characteristic within the B frame of FIG. 11, the wheel speed=0 is maintained from time t2 to time t3, and the vehicle can be smoothly stopped without being moved backward.

Hence, in the first embodiment, the limit processing is performed, according to the motor rotation speed Nm (vehicle speed), on the regeneration amount immediately before the stop of the vehicle, and thus a passenger is prevented from feeling shocks or uncomfortable vibrations, and it is possible to realize smooth deceleration without acceleration vibrations. Moreover, since it is possible to decelerate the vehicle without using a braking force of a mechanical braking unit until immediately before the stop of the vehicle, it is possible to reliably perform the regeneration until immediately before the stop of the vehicle, with the result that it can be expected that electricity efficiency is enhanced.

In the first embodiment, when the torque limitation processing is started, even if an instruction to change the regeneration amount is provided by the driver, it is not received, and the regeneration instruction torque limitation processing is performed.

As described above, the instruction to change the regeneration amount from the driver is not received, and thus it is possible to prevent the following situation: the regeneration amount is suddenly changed by the driver immediately before the stop of the vehicle, and thus back-and-forth G variations are increased or the vehicle slides down on an uphill road.

[Regenerative Braking Vehicle Stop Action in a Different Vehicle Stop Mode]

For example, when the limit processing using only one limit map is performed, the correspondence to the requirement change of the driver caused under the regenerative braking control and another control intervention are lowered. Hence, it is necessary to produce an idea for acquiring a correspondence in a different vehicle stop mode. A regenerative braking vehicle stop action in a different vehicle stop mode reflecting this will be described below with reference to FIGS. 12 to 19.

(Limitation Action at the Time of Flat Road Vehicle Stop)

Figure 12:
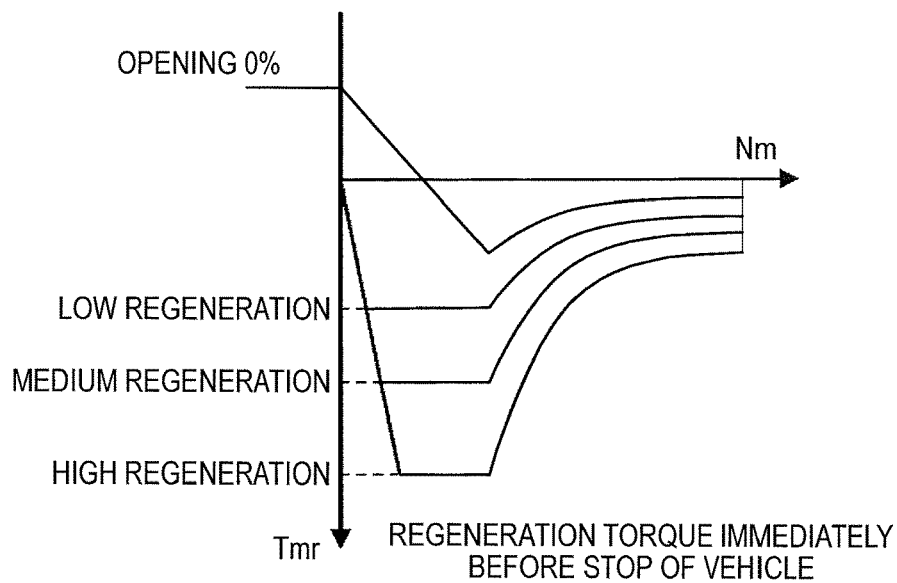
FIG. 12 is a regeneration torque map diagram showing a regeneration instruction torque limitation action when the vehicle is stopped on a flat road.

FIG. 12 is a regeneration torque map diagram showing a regeneration instruction torque limitation action when the vehicle is stopped on a flat road. The limitation action at the time of flat road vehicle stop will be described below with reference to FIG. 12.

In the first embodiment, the following configuration is adopted: as the regeneration torque limit map, the limit maps 71, 72, 74 and 75 are provided in which the limit characteristic where in order for the vehicle to be stopped, as the vehicle speed is lowered, the regeneration amount is limited to be decreased is set. (FIG. 7).

In this configuration, as shown in FIG. 12, the regeneration amount is limited by the limit characteristic in which immediately before the stop of the vehicle, the limit map lower limit value Tlim is zero torque at the motor rotation speed Nm=0 (vehicle speed 0 km/h).

Hence, the regeneration amount is limited such that the vehicle is stopped, and thus it is possible to reduce acceleration vibrations (back-and-forth G vibrations) caused by pitching or the like produced when the vehicle is stopped. It is also possible to stop the vehicle smoothly without an uncomfortable feeling.

(Limitation Action at the Time of Uphill Road Vehicle Stop)

Figure 13:
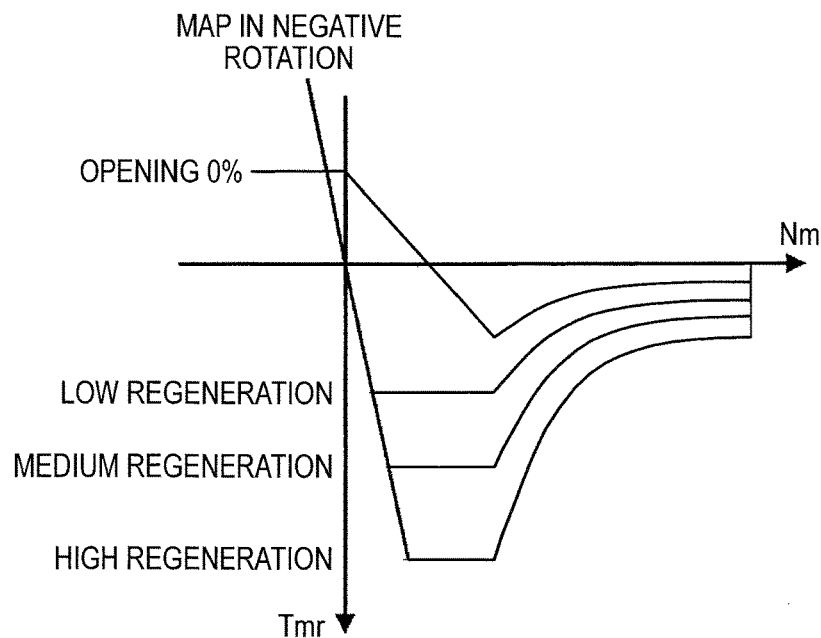
FIG. 13 is a regeneration torque map diagram showing a regeneration instruction torque limitation action when the vehicle is stopped on an uphill road.

FIG. 13 is a regeneration torque map diagram showing a regeneration instruction torque limitation action when the vehicle is stopped on an uphill road. The limitation action at the time of uphill road vehicle stop will be described below with reference to FIG. 13.

In the first embodiment, a configuration is adopted in which in the limit maps 71, 72, 74 and 75, the second quadrant that is the drive torque in negative rotation is also made to have the limit characteristic (FIG. 7).

For example, when the regeneration is performed on an uphill road, if the second quadrant does not have the limit characteristic, the vehicle may significantly slide down after the vehicle is stopped.

On the other hand, since as shown in FIG. 13, the second quadrant is made to have the limit characteristic, when the vehicle starts to slide down along the road surface gradient after the vehicle is stopped, the drive torque (positive torque) is output according to negative rotation, with the result that it is possible to gently reduce the speed at which the vehicle slides down.

Hence, after the vehicle is stopped on an uphill road, by the gentle downward sliding of the vehicle, it is possible to urge the driver to perform a brake operation.

(Limitation Action at the Time of Gradient Road Surface Vehicle Stop)

Figure 14:
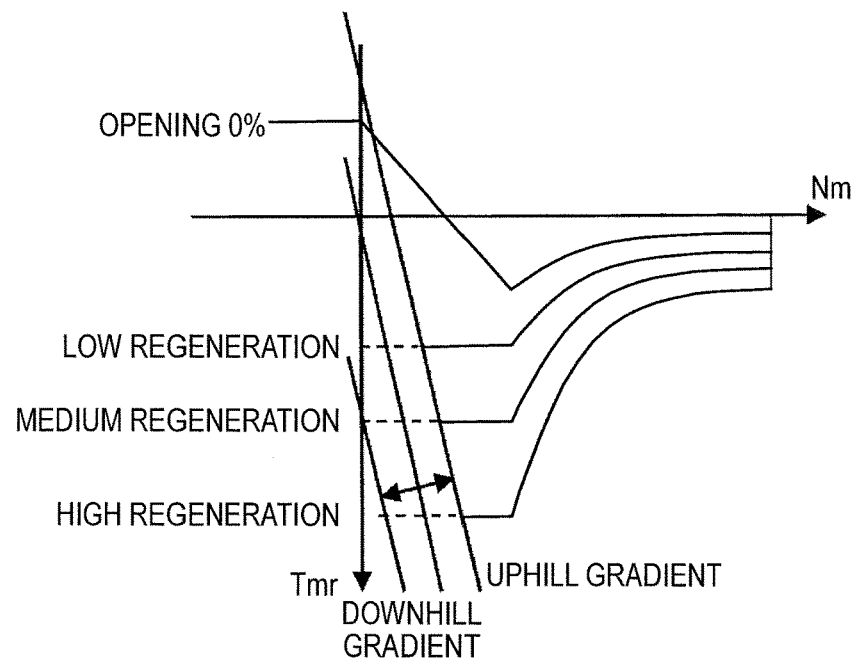
FIG. 14 is a regeneration torque map diagram showing a regeneration instruction torque limitation action when a road surface gradient is different.

FIG. 14 is a regeneration torque map diagram showing a regeneration instruction torque limitation action when the road surface gradient is different. The limitation action at the time of gradient road surface vehicle stop will be described below with reference to FIG. 14.

In the first embodiment, a configuration is adopted in which in the regeneration instruction torque limitation, the regeneration instruction torque limitation processing is performed so as to have a correspondence in gradient to variations in the road surface gradient (step S5-15 step S5-16 in FIG. 9).

In this configuration, as shown in FIG. 14, the regeneration amount is limited by the limit characteristic in which when the vehicle is stopped on an uphill gradient, the limit map lower limit value Tlim is a positive torque at the motor rotation speed Nm=0 (vehicle speed 0 km/h). On the other hand, the regeneration amount is limited by the limit characteristic in which when the vehicle is stopped on a downhill gradient, the limit map lower limit value Tlim is a negative torque at the motor rotation speed Nm=0 (vehicle speed 0 km/h).

Hence, it is possible to smoothly stop the vehicle, regardless of the stop of the vehicle on the gradient road surface, such that when the vehicle is stopped on an uphill gradient, the vehicle is prevented from sliding down in a downward direction whereas when the vehicle is stopped on a downhill gradient, the vehicle is prevented from sliding down in a forward direction.

Furthermore, in the regeneration instruction torque limitation, the gradient correction torque calculation portion 80 for calculating the gradient correction torque Tg according to the road surface gradient is provided, the limit map lower limit value Tlim with reference to a flat road obtained by the regeneration instruction torque limitation processing is corrected by the gradient correction torque Tg and thus the regeneration torque lower limit value Tmin is calculated (FIG. 7).

By the addition of the gradient correction torque Tg corresponding to the road surface gradient, it is not necessary to prepare, as the limit map, a large number of limit maps corresponding to the road surface gradient, and only the limit map with reference to a flat road is preferably prepared.

Hence, with the simple configuration in which a large number of limit maps corresponding to the road surface gradient are not prepared, it is possible to smoothly stop the vehicle on any gradient road surface such as an uphill gradient or a downhill gradient.

(Limitation Action at the Time of the Intervention of the Brake Operation)

Figure 15:
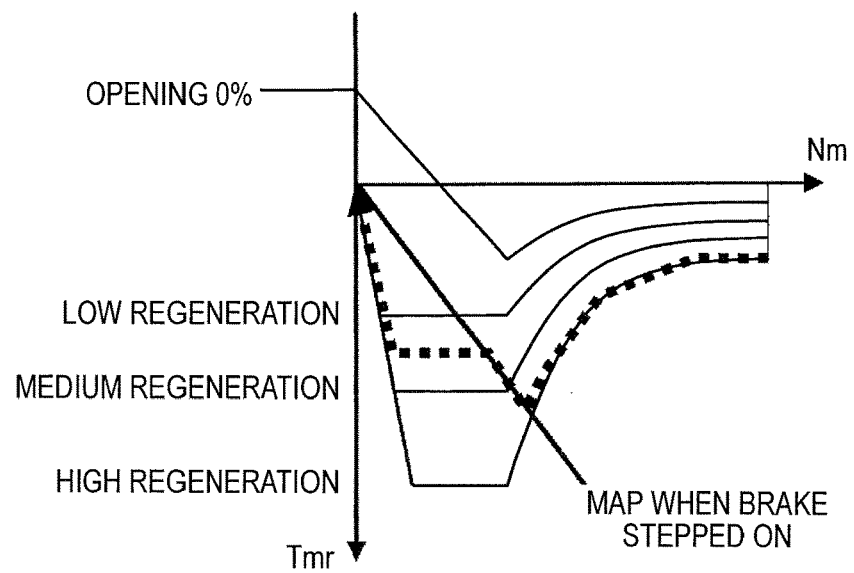
FIG. 15 is a regeneration torque map diagram showing a regeneration instruction torque limitation action when a brake operation by a driver intervenes.

FIG. 15 is a regeneration torque map showing a regeneration instruction torque limitation action at the time of the intervention of the brake operation by the driver. The limitation action at the time of the intervention of the brake operation will be described below with reference to FIG. 15.

In the first embodiment, in the regeneration instruction torque limitation, as the regeneration torque limit map, the limit map at the time of the brake operation 74 in which the inclination is set gentler than that of the limit characteristic when the vehicle is stopped on a flat road is provided (FIG. 7). The configuration is adopted in which when the driver operates the mechanical brake immediately before the stop of the vehicle, the limit map at the time of the brake operation 74 is selected (step S5-11→step S5-12 in FIG. 9).

For example, without provision of the limit map at the time of the brake operation 74, as shown in the dotted characteristic of FIG. 15, when the brake is released, after the regeneration amount is retained, the regeneration amount is returned by a limit characteristic of steep inclination and thus an uncomfortable feeling is provided when the brake is released. On the other hand, when the mechanical brake is operated, the characteristic is changed to a limit characteristic of gentle inclination, and thus it is possible to reduce an uncomfortable feeling when the brake is released.

Furthermore, in the first embodiment, as the amount of operation on the mechanical brake by the driver is increased, the inclination of the limit characteristic of the limit map at the time of the brake operation 74 is made gentler (FIG. 7).

Hence, by determining the inclination of the limit map at the time of the brake operation 74 according to the amount of operation on the brake by the driver, it is possible to reduce an uncomfortable feeling caused by the deceleration G on the amount of operation on the brake.

(Limitation Action at the Time of the Intervention of Slip Control)

Figure 16:
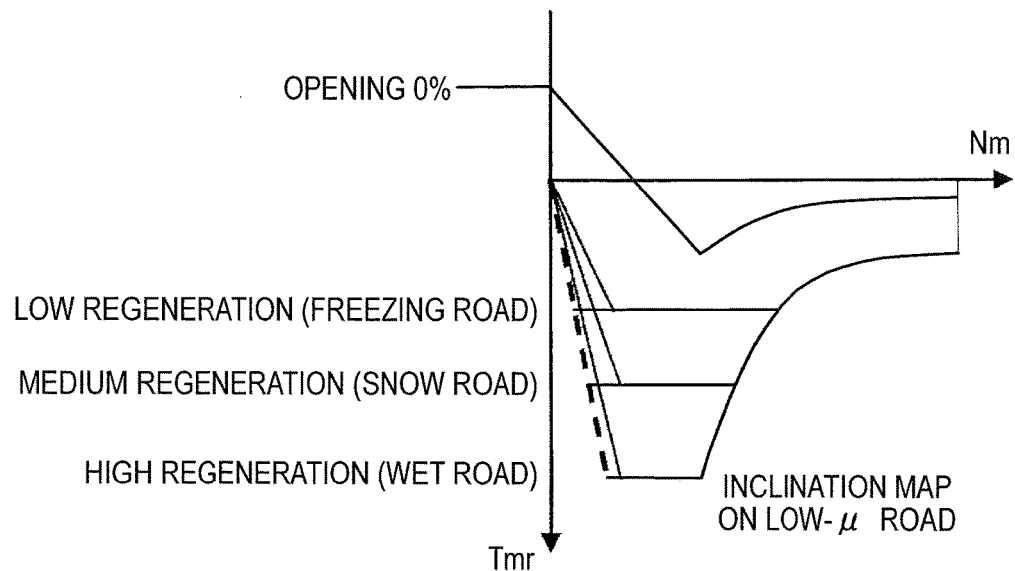
FIG. 16 is a regeneration torque map diagram showing a regeneration instruction torque limitation action when slip control (paddle regeneration ABS control) on a low-μ road intervenes.

FIG. 16 is a regeneration torque map showing a regeneration instruction torque limitation action at the time of the intervention of slip control (paddle regeneration ABS control) on a low-μ road. The limitation action at the time of the intervention of the slip control will be described below with reference to FIG. 16.

In the first embodiment, in the regeneration instruction torque limitation, as the regeneration torque limit map, the limit map at the time of slip control 75 in which the inclination is set gentler than that of the limit characteristic a when the vehicle is stopped on a flat road is provided (FIG. 7). The configuration is adopted in which when the slip control for reducing the drive wheel slip is performed immediately before the stop of the vehicle, the limit map at the time of slip control 75 is selected (step S5-13→step S5-14 in FIG. 9).

For example, at the time of travel on a low-μ road, as shown in the dotted characteristic of FIG. 16, when the regeneration amount is returned by great inclination as on a high-μ road, the amount of braking slip of the tire is increased, a state where braking is locked is entered and the wheel speed is brought into the state of vibrations. This causes acceleration vibrations to provide an uncomfortable feeling.

On the other hand, by setting the inclination of the limit characteristic gentler at the time of travel on a low-μ road, it is possible to smoothly stop the vehicle even when the vehicle is stopped on a low-μ road through the slip control.

Here, when the slip control by the electric motor 4 is performed, the instruction torque Tm under the motor slip control is varied depending on the state of the road surface (road surface μ). Hence, with the instruction torque Tm under the slip control, it is possible to grasp the state of the road surface. Hence, as shown in FIG. 16, by setting the inclination of the limit characteristic gentler according to the instruction torque Tm under the slip control, it is possible to smoothly stop the vehicle even on various low-μ roads (such as a wet road, a snow road and a freezing road).

(Limitation Action at the Time of the Re-Intervention of an Instruction to Decelerate)

Figure 17:
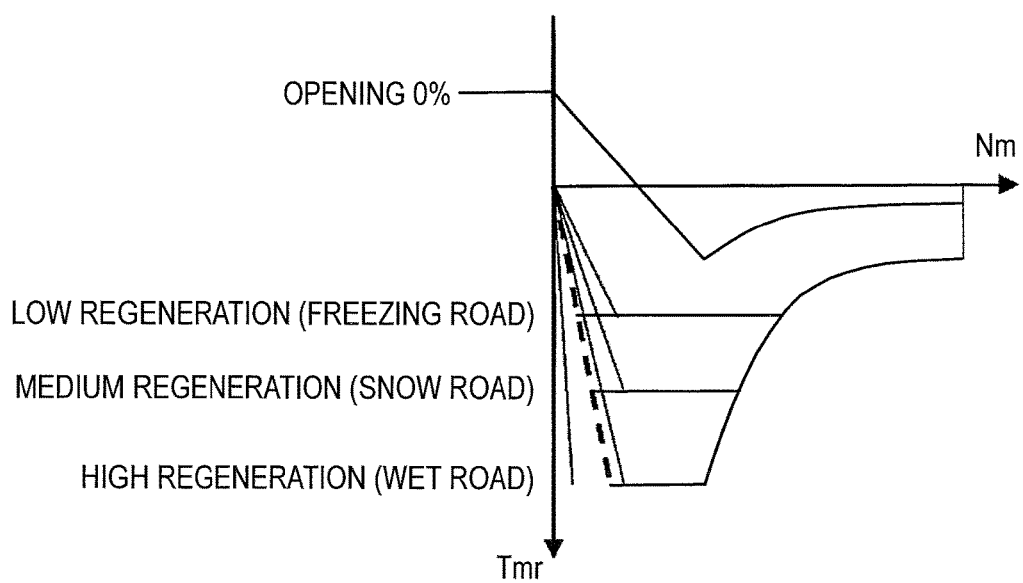
FIG. 17 is a regeneration torque map diagram showing a regeneration instruction torque limitation action when an instruction to decelerate (paddle DOWN) intervenes again with a limit map at the time of slip control selected.

FIG. 17 is a regeneration torque map showing a regeneration instruction torque limitation action at the time of the re-intervention of an instruction to decelerate (paddle DOWN). The limitation action at the time of the intervention of an instruction to decelerate will be described below with reference to FIG. 17.

In the first embodiment, in the regeneration instruction torque limitation, as the regeneration torque limit map, the limit map of sudden braking 72 in which the inclination is set steeper than that of the limit characteristic when the vehicle is stopped on a flat road is provided (FIG. 7). The configuration is adopted in which when the limit map at the time of slip control 75 is selected, if an instruction to decelerate is further provided immediately before the stop of the vehicle, the limit map of sudden braking 72 is selected (step S5-9 step S5-10 in FIG. 9).

In other words, when an instruction to decelerate is further provided immediately before the stop of the vehicle, it can be determined to be emergency stop. Hence, as shown in FIG. 17, the inclination of the limit characteristic is set steeper. As described above, although variations in wheel speed and acceleration vibrations are slightly produced, the inclination of the limit characteristic is set steeper, and thus the intention of the driver to perform emergency stop is prioritized.

Hence, when an instruction to decelerate is further provided immediately before the stop of the vehicle, the inclination of the limit characteristic is set steeper, and thus it is possible to reduce a stop distance.

(Limitation Action at the Time of the Intervention of an Instruction to Accelerate)

Figure 18:
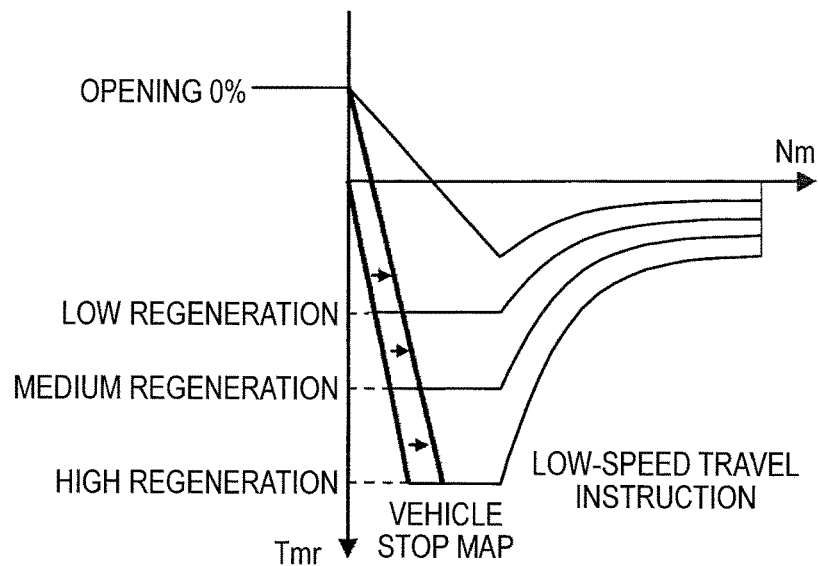
FIG. 18 is a regeneration torque map diagram showing a regeneration instruction torque limitation action when an instruction to accelerate (paddle UP) intervenes with a limit map of stop of the vehicle selected.

FIG. 18 is a regeneration torque map showing a regeneration instruction torque limitation action at the time of the intervention of an instruction to accelerate (paddle UP). The limitation action at the time of the intervention of an instruction to accelerate will be described below with reference to FIG. 18.

In the first embodiment, in the regeneration instruction torque limitation, as the regeneration torque limit map, the limit map of stop of the vehicle 71 which is suitable for the stop of the vehicle and the limit map at the time of creep 73 in which the creep characteristic suitable for low-speed travel is set are provided (FIG. 7). The configuration is adopted in which when the limit map of stop of the vehicle 71 is selected, if an instruction to accelerate is provided immediately before the stop of the vehicle, the limit map at the time of creep 73 is selected (step S5-7→step S5-8 in FIG. 9).

In a scene where the automobile ahead is followed, such as congestion or signal wait, there are times when low-speed travel is desired to be continued. However, when an accelerator is stepped on, a drive torque is suddenly produced to provide an uncomfortable feeling. Hence, when an instruction to accelerate is provided immediately before the stop of the vehicle, as shown in FIG. 18, the limit map of stop of the vehicle 71 is switched to the limit map at the time of creep 73. In this way, the vehicle continuously and slowly travels forward without being stopped. Hence, when an instruction to accelerate is provided immediately before the stop of the vehicle, since the vehicle continuously and slowly travels forward without performing the operation of stepping on the accelerator to produce a drive torque suddenly, it is possible to enhance a response to an acceleration requirement immediately before the stop of the vehicle.

(Limitation Action at the Time of the Intervention of an Instruction to Decelerate)

Figure 19:
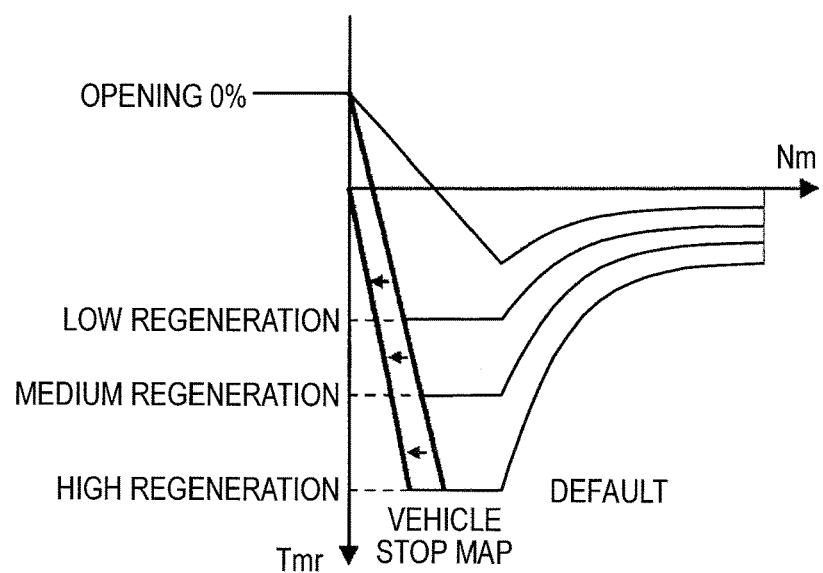
FIG. 19 is a regeneration torque map diagram showing a regeneration instruction torque limitation action when an instruction to decelerate (paddle DOWN) intervenes with a limit map at the time of creep selected.

FIG. 19 is a regeneration torque map showing a regeneration instruction torque limitation action at the time of the intervention of an instruction to decelerate (paddle DOWN). The limitation action at the time of the intervention of an instruction to decelerate will be described below with reference to FIG. 19.

In the first embodiment, in the regeneration instruction torque limitation, the configuration is adopted in which when the limit map at the time of creep 73 is selected, if an instruction to decelerate is provided immediately before the stop of the vehicle, the limit map is switched to the limit map of stop of the vehicle 71 (step S5-4→step S5-5 in FIG. 9).

In other words, when the limit map at the time of creep 73 is selected, if an instruction to decelerate is further provided immediately before the stop of the vehicle, as shown in FIG. 19, the limit map at the time of creep 73 is switched to the limit map of stop of the vehicle 71.

For example, in a scene where the automobile ahead is followed, such as congestion or signal wait, the limit map at the time of creep 73 is selected, and thus it is possible to expect that the low-speed travel is continued. Hence, when the limit map at the time of creep 73 is selected, only if an instruction to decelerate is provided, the limit map is switched to the limit map of stop of the vehicle 71, and thus it is possible to stop the vehicle in a position targeted by the driver.

Effects will now be described.

In the regenerative braking control device of the electric vehicle according to the first embodiment, it is possible to obtain the following effects.

(1) In the electric vehicle system that includes the electric motor 4 coupled to a drive wheel, the electric motor controller 1 which controls powering/regeneration of the electric motor 4 and the regeneration amount setting unit (the steering switch 11) which sets the regeneration amount by the driver operation and that can change the regeneration amount according to the intention of the driver, the electric motor controller 1 includes the regeneration instruction torque limitation unit (step S5 in FIG. 2 and FIGS. 7 and 9) that limits, immediately before stop of the vehicle, the regeneration amount to be decreased as the vehicle speed is lowered.

Hence, in the electric vehicle that can change the regeneration amount according to the intention of the driver, it is possible to acquire a smooth deceleration feeling without acceleration vibrations until immediately before stop of the vehicle.

(2) When torque limitation processing is started, even if an instruction to change the regeneration amount is provided by the driver, the regeneration instruction torque limitation unit (step S5 in FIG. 2 and FIGS. 7 and 9) does not receive the instruction and performs regeneration instruction torque limitation processing.

Hence, in addition to the effect of (1), it is possible to prevent the following situation: the regeneration amount is suddenly changed by the driver immediately before the stop of the vehicle, and thus back-and-forth G variations are increased or the vehicle slides down on an uphill road.

(3) The regeneration instruction torque limitation unit (step S5 in FIG. 2 and FIGS. 7 and 9) has, as the regeneration torque limit map, limit maps 71, 72, 74 and 75 (FIG. 7) which is set at such a limit characteristic that the regeneration amount is limited to be decreased as the vehicle speed is lowered so as to stop the vehicle.

Hence, in addition to the effect of (1) or (2), it is possible to reduce acceleration vibrations (back-and-forth G vibrations) caused by pitching or the like produced when the vehicle is stopped. It is also possible to stop the vehicle smoothly without an uncomfortable feeling.

(4) In the limit maps 71, 72, 74 and 75, a second quadrant that is a drive torque in negative rotation also has the limit characteristic (FIG. 7).

Hence, after the vehicle is stopped on an uphill road, by the gentle downward sliding of the vehicle, it is possible to urge the driver to perform a brake operation.

(5) The regeneration instruction torque limitation unit (step S5 in FIG. 2 and FIGS. 7 and 9) performs the regeneration instruction torque limitation processing so as to correspond to variations in the road surface gradient (step S5-15→step S5-16 in FIG. 9).

Hence, in addition to the effects of (1) to (4), when the vehicle is stopped on an uphill gradient, the vehicle is prevented from sliding down in a downward direction whereas when the vehicle is stopped on a downhill gradient, the vehicle is prevented from sliding down in a forward direction, with the result that it is possible to smoothly stop the vehicle even when the vehicle is stopped on the gradient road surface.

(6) The regeneration instruction torque limitation unit (step S5 in FIG. 2 and FIGS. 7 and 9) includes the gradient correction torque calculation portion 80 that calculates the gradient correction torque Tg according to the road surface gradient, and corrects, with the gradient correction torque Tg, the limit map lower limit value Tlim with reference to a flat road obtained by the regeneration instruction torque limitation processing so as to calculate the regeneration torque lower limit value Tmin (FIG. 7).

Hence, in addition to the effect of (5), with the simple configuration in which a large number of limit maps corresponding to the road surface gradient are not prepared, it is possible to smoothly stop the vehicle on any gradient road surface such as an uphill gradient or a downhill gradient.

(7) The regeneration instruction torque limitation unit (step S5 in FIG. 2 and FIGS. 7 and 9) has, as the regeneration torque limit map, the limit map at the time of a brake operation 74 whose inclination is set gentler than the limit characteristic at the time of stop of the vehicle on a flat road (FIG. 7), and selects the limit map at the time of the brake operation 74 when the driver operates the mechanical brake immediately before stop of the vehicle (step S5-11→step S5-12 in FIG. 9).

Hence, in addition to the effects of (1) to (6), when the mechanical brake is operated by the driver immediately before stop of the vehicle, the characteristic is changed to the limit characteristic of gentle inclination, and thus it is possible to reduce an uncomfortable feeling when the brake is released.

(8) In the limit map at the time of the brake operation 74, as the amount of operation of the mechanical brake by the driver is increased, the inclination of the limit characteristic is set gentler (FIG. 7).

Hence, in addition to the effect of (7), as the amount of operation of the mechanical brake by the driver is increased, the inclination of the limit characteristic is set gentler, with the result that it is possible to reduce an uncomfortable feeling of the deceleration G on the amount of operation of the brake.

(9) The regeneration instruction torque limitation unit (step S5 in FIG. 2 and FIGS. 7 and 9) has, as the regeneration torque limit map, the limit map at the time of slip control 75 whose inclination is set gentler than the limit characteristic at the time of stop of the vehicle on a flat road (FIG. 7), and selects the limit map at the time of slip control 75 when slip control for reducing slip of the drive wheel is performed immediately before stop of the vehicle (step S5-13→step S5-14 in FIG. 9).

Hence, in addition to the effects of (1) to (8), by setting the inclination of the limit characteristic gentler when the slip control for reducing the slip of the drive wheel is performed immediately before stop of the vehicle, it is possible to smoothly stop the vehicle even when the vehicle is stopped on a low-μ road through the slip control.

(10) The regeneration instruction torque limitation unit (step S5 in FIG. 2 and FIGS. 7 and 9) has, as the regeneration torque limit map, the limit map of sudden braking 72 whose inclination is set steeper than the limit characteristic at the time of stop of the vehicle on a flat road (FIG. 7), and selects the limit map of sudden braking 72 when an instruction to decelerate is further provided immediately before stop of the vehicle with the limit map at the time of slip control 75 selected (step S5-9→step S5-10 in FIG. 9).

Hence, in addition to the effect of (9), when an instruction to decelerate is further provided immediately before the stop of the vehicle with the limit map at the time of slip control 75 selected, the inclination of the limit characteristic is set steeper, and thus it is possible to reduce a stop distance.

(11) The regeneration instruction torque limitation unit (step S5 in FIG. 2 and FIGS. 7 and 9) has, as the regeneration torque limit map, the limit map of stop of the vehicle 71 suitable for stop of the vehicle and the limit map at the time of creep 73 where a creep characteristic suitable for low-speed travel is set (FIG. 7), and selects the limit map at the time of creep 73 when an instruction to accelerate is provided immediately before stop of the vehicle with the limit map of stop of the vehicle 71 selected (step S5-7→step S5-8 in FIG. 9).

Hence, in addition to the effects of (1) to (10), when an instruction to accelerate is provided immediately before the stop of the vehicle with the limit map of stop of the vehicle 71 selected, it is possible to continuously and slowly travel forward while enhancing a response to an acceleration requirement immediately before the stop of the vehicle.

(12) The regeneration instruction torque limitation unit (step S5 in FIG. 2 and FIGS. 7 and 9) switches to the limit map of stop of the vehicle 71 when an instruction to decelerate is provided immediately before stop of the vehicle with the limit map at the time of creep 73 selected (step S5-4→step S5-5 in FIG. 9).

Hence, in addition to the effect of (11), when the limit map at the time of creep 73 is selected, only if an instruction to decelerate is provided, the limit map is switched to the limit map of stop of the vehicle 71, and thus it is possible to stop the vehicle in a position targeted by the driver.

Although the regenerative braking control device of the electric vehicle according to the present invention has been described above based on the first embodiment, the specific configuration is not limited to the first embodiment, and design modifications and additions and the like can be permitted without departing from the spirit of the invention of the claims in the scope of claims.

In the first embodiment, as the regeneration instruction torque limitation unit, various limit maps 71, 72, 73, 74 and 75 are used immediately before the stop of the vehicle, and the regeneration amount is limited to be decreased as the motor rotation speed (vehicle speed) is lowered. However, as the regeneration instruction torque limitation unit, without use of the limit maps, when a vehicle speed area immediately before the stop of the vehicle is reached, a limitation torque is determined by computation, with the result that the regeneration amount may be limited to be decreased.

In the first embodiment, the example where the regenerative braking control device of the present invention is applied to the electric vehicle has been described. However, the regenerative braking control device of the electric vehicle according to the present invention can also be applied to a hybrid vehicle incorporating an electric motor.

This application claims priority based on Japanese Patent Application No. 2012-18057 filed with Japan Patent Office on Jan. 31, 2012, all the contents of which are hereby incorporated by reference.

Exclusive nature or features of the embodiments of this invention are claimed as follows.

The invention claimed is:

1. A regenerative braking control device of an electric vehicle, wherein the electric vehicle includes an electric motor coupled to a drive wheel, the regenerative braking control device comprising:
   an electric motor controller that controls powering or regeneration of the electric motor; and
   a regeneration amount setting unit that sets a regeneration amount by a driver operation and that can change the regeneration amount according to an intention of a driver; and
   a gradient estimating unit that estimates road surface gradient of the vehicle,
   wherein the electric motor controller includes a regeneration instruction torque limitation unit that limits the regeneration amount so as to decrease when a vehicle speed is reduced, and
   wherein, when the regeneration instruction torque limitation unit starts to perform, even if an instruction to change the regeneration amount is provided by the driver, the regeneration instruction torque limitation unit limits the regeneration instruction torque without receiving the instruction.

2. The regenerative braking control device of an electric vehicle according to claim 1,
   wherein the regeneration instruction torque limitation unit comprises a regeneration torque limit map in which:
   a horizontal axis represents the motor rotation speed,
   a vertical axis represents a regeneration torque,
   a first limit characteristic at a time of stop of the vehicle on a flat road is set, and
   a second limit characteristic is set when a braking operation is being performed,
   wherein a change of regeneration torque with respect to a change in motor rotation speed associated with the second limit characteristic is less than a change of regenerative torque with respect to a change in motor rotation speed associated with the first limit characteristic, and
   wherein the regeneration instruction torque limitation unit selects the limit map where the second limit characteristic at the time of the brake operation is set when the driver operates a mechanical brake immediately before stop of the vehicle.

3. The regenerative braking control device of an electric vehicle according to claim 2,
   wherein in the limit map where the second limit characteristic at the time of the brake operation is set, as an amount of operation of the mechanical brake by the driver is increased, the amount of the variation of the regeneration torque with respect to the variation of the motor rotation speed of the second limit characteristic is set to be smaller.

4. The regenerative braking control device of an electric vehicle according to claim 1,
   wherein the regeneration instruction torque limitation unit comprises a regeneration torque limit map in which:
   a limit characteristic is set when slip control is being performed,
   wherein a change of regeneration torque with respect to a change in motor rotation speed associated with the limit characteristic is less than a change of regenerative torque with respect to a change in motor rotation speed associated with a limit map of stop of the vehicle on a flat road, and
   wherein the regeneration instruction torque limitation unit selects the limit map where the limit characteristic at the time of slip control is set when slip control for reducing slip of the drive wheel is performed immediately before stop of the vehicle.

5. The regenerative braking control device of an electric vehicle according to claim 1,
   wherein in a regeneration torque limit map of the regeneration instruction torque limitation unit, a limit characteristic is set when sudden braking is being performed,
   wherein a change of regeneration torque with respect to a change in motor rotation speed associated with the limit characteristic is more than a change of regenerative torque with respect to a change in motor rotation speed associated with a limit map of stop of the vehicle on a flat road, and
   wherein the regeneration instruction torque limitation unit selects a limit map where the limit characteristic of sudden braking is set, when an instruction to decelerate is further provided immediately before stop of the vehicle, and when a limit map where the limit characteristic at the time of slip control is selected.

6. The regenerative braking control device of an electric vehicle according to claim 1,
   wherein the regeneration instruction torque limitation unit comprises:
   a first regeneration torque limit map that is suitable for stop of the vehicle, and
   a second regeneration torque limit map which is used at a time of creep of the vehicle and which is suitable for low-speed travel, and
   wherein the regeneration instruction torque limitation unit selects the second limit map at the time of creep of the vehicle, when an instruction to accelerate is provided immediately before stop of the vehicle, and when the first limit map suitable for stop of the vehicle is selected.

7. The regenerative braking control device of an electric vehicle according to claim 6,
   wherein the regeneration instruction torque limitation unit switches to the first limit map suitable for stop of the vehicle, when an instruction to decelerate is provided immediately before stop of the vehicle, and when the second regeneration torque limit map is selected.

8. A regenerative braking control device of an electric vehicle, wherein the electric vehicle includes an electric motor coupled to a drive wheel, the regenerative braking control device comprising:
- an electric motor controller that controls powering or regeneration of the electric motor; and
- a regeneration amount setting unit that sets a regeneration amount by a driver operation and that can change the regeneration amount according to an intention of a driver; and
- a gradient estimating unit that estimates road surface gradient of the vehicle,
- wherein the electric motor controller includes a regeneration instruction torque limitation unit that limits the regeneration amount so as to decrease when a vehicle speed is reduced, and
- wherein the regeneration instruction torque limitation unit limits the regeneration amount at a higher vehicle speed on an uphill gradient than on a downhill gradient.

9. A regenerative braking control device of an electric vehicle, wherein the electric vehicle includes an electric motor coupled to a drive wheel, the regenerative braking control device comprising:
- an electric motor controller that controls powering or regeneration of the electric motor; and
- a regeneration amount setting unit that sets a regeneration amount by a driver operation and that can change the regeneration amount according to an intention of a driver,
- wherein the electric motor controller includes a regeneration instruction torque limitation unit that limits, immediately before stop of the vehicle with a motor rotation speed in a low-speed area, the regeneration amount so as to decrease when the motor rotation speed is reduced,
- wherein the regeneration instruction torque limitation unit includes a gradient correction torque calculation portion that calculates a gradient correction torque according to a plurality of limit maps which are set with reference to a flat road and a road surface gradient,
- wherein a torque value obtained based on any map selected from the limit maps by operations of the driver and the motor rotation speed is set as a limit map lower limit value,
- wherein a regeneration torque lower limit value is calculated by correcting the limit map lower limit value by using the gradient correction torque such that a process of the regeneration instruction torque limitation unit is performed to correspond to variations in the road surface gradient, and
- wherein when torque limitation processing is started, even if an instruction to change the regeneration amount is provided by the driver, the regeneration instruction torque limitation unit performs regeneration instruction torque limitation processing without receiving the instruction.

* * * * *